(12) United States Patent
Yamaguchi

(10) Patent No.: US 7,533,746 B2
(45) Date of Patent: May 19, 2009

(54) ENGINE CONTROL APPARATUS, CONTROL METHOD AND CONTROL SYSTEM

(75) Inventor: Kazuhi Yamaguchi, Hyogo (JP)

(73) Assignee: Fujitsu Ten Limited, Kobe-shi (JP)

( * ) Notice: Subject to any disclaimer, the term of this patent is extended or adjusted under 35 U.S.C. 154(b) by 175 days.

(21) Appl. No.: 11/498,909

(22) Filed: Aug. 4, 2006

(65) Prior Publication Data
US 2007/0032915 A1    Feb. 8, 2007

(30) Foreign Application Priority Data

| Aug. 5, 2005 | (JP) | ............................. 2005-228543 |
| Aug. 2, 2006 | (JP) | ............................. 2006-211082 |

(51) Int. Cl.
*B60W 20/00* (2006.01)

(52) U.S. Cl. ................................. 180/65.29; 180/65.28

(58) Field of Classification Search ................ 180/65.2, 180/65.3, 65.4, 65.8; 903/941, 943
See application file for complete search history.

(56) References Cited

U.S. PATENT DOCUMENTS

| 5,285,862 | A | * | 2/1994 | Furutani et al. ............ 180/65.4 |
| 5,739,667 | A |   | 4/1998 | Matsuda et al. |
| 5,828,201 | A | * | 10/1998 | Hoffman et al. ............ 320/104 |
| 5,869,950 | A | * | 2/1999 | Hoffman et al. ............ 320/103 |
| 5,905,360 | A | * | 5/1999 | Ukita ......................... 320/118 |
| 5,984,034 | A | * | 11/1999 | Morisawa et al. .......... 180/65.2 |
| 6,114,775 | A | * | 9/2000 | Chung et al. ............... 307/10.1 |
| 6,119,799 | A | * | 9/2000 | Morisawa et al. .......... 180/65.2 |
| 6,204,636 | B1 | * | 3/2001 | Kinoshita et al. ........... 320/134 |
| 6,211,681 | B1 | * | 4/2001 | Kagawa et al. ............. 324/426 |
| 6,225,784 | B1 | * | 5/2001 | Kinoshita et al. ........... 320/132 |
| 6,232,748 | B1 | * | 5/2001 | Kinoshita .................... 320/132 |
| 6,242,886 | B1 |   | 6/2001 | Palanisamy et al. |
| 6,314,346 | B1 | * | 11/2001 | Kitajima et al. ............... 701/22 |
| 6,314,347 | B1 | * | 11/2001 | Kuroda et al. ................. 701/22 |
| 6,334,498 | B1 | * | 1/2002 | Morisawa et al. .......... 180/65.2 |
| 6,335,574 | B1 | * | 1/2002 | Ochiai et al. .............. 290/40 C |
| 6,358,180 | B1 | * | 3/2002 | Kuroda et al. ................... 477/4 |

(Continued)

FOREIGN PATENT DOCUMENTS

EP    1 494 332 A2    1/2005

(Continued)

*Primary Examiner*—Jeffrey J Restifo
(74) *Attorney, Agent, or Firm*—Oliff & Berridge, PLC

(57) ABSTRACT

A first buttery supplies power to an electrical load of a vehicle when an engine is in a normal operation. A second buttery supplies power to the electrical load of the vehicle when the engine is in an economical operation. A voltage regulator regulates voltages of the first buttery and the second buttery. A current limiter limits a current value flowing from the voltage regulator to the second battery to a limiting value. An engine stopping unit stops the engine when a first predetermined condition is established. An activator starts the engine when a second predetermined condition is established. A current detecting unit detects the current value when a second battery is charged. A changing unit changes a limiting value between a first limiting value and a second limiting value which is higher than the first limiting value according to the detected current value in a case where the voltage of the second battery is no more than a second predetermined value and the voltage of the first battery is no less than a first predetermined value.

22 Claims, 18 Drawing Sheets

U.S. PATENT DOCUMENTS

| | | | |
|---|---|---|---|
| 6,380,641 B2* | 4/2002 | Matsubara et al. | 290/40 C |
| 6,408,968 B1* | 6/2002 | Wakashiro et al. | 180/65.3 |
| 6,501,250 B2* | 12/2002 | Bito et al. | 320/152 |
| 6,546,320 B2* | 4/2003 | Shimizu et al. | 701/22 |
| 6,621,244 B1* | 9/2003 | Kiyomiya et al. | 318/611 |
| 6,630,810 B2* | 10/2003 | Takemasa et al. | 320/104 |
| 6,677,725 B2* | 1/2004 | Tamai et al. | 320/103 |
| 6,739,418 B2* | 5/2004 | Ogata et al. | 180/65.2 |
| 6,752,226 B2* | 6/2004 | Naito et al. | 180/65.3 |
| 6,766,874 B2* | 7/2004 | Naito et al. | 180/65.3 |
| 6,857,491 B2* | 2/2005 | Wakashiro et al. | 180/65.2 |
| 6,891,279 B2* | 5/2005 | Kazama | 290/40 C |
| 6,923,279 B2* | 8/2005 | Shimane et al. | 180/65.1 |
| 2001/0004203 A1* | 6/2001 | Matsubara et al. | 322/16 |
| 2002/0003417 A1* | 1/2002 | Bito et al. | 320/152 |
| 2002/0007975 A1* | 1/2002 | Naito et al. | 180/65.3 |
| 2002/0023789 A1* | 2/2002 | Morisawa et al. | 180/65.2 |
| 2002/0157883 A1* | 10/2002 | Ogata et al. | 180/65.4 |
| 2003/0094816 A1* | 5/2003 | Kazama | 290/40 C |
| 2003/0117113 A1* | 6/2003 | Takemasa et al. | 320/150 |
| 2003/0140880 A1* | 7/2003 | Kahlon et al. | 123/179.3 |
| 2003/0183430 A1* | 10/2003 | Naito et al. | 180/65.2 |
| 2003/0225501 A1* | 12/2003 | De La Salle et al. | 701/93 |
| 2004/0099234 A1* | 5/2004 | Tamai et al. | 123/179.3 |
| 2004/0134698 A1* | 7/2004 | Yamamoto et al. | 180/65.2 |
| 2005/0001606 A1* | 1/2005 | Kagoshima | 323/371 |
| 2006/0058897 A1* | 3/2006 | Senda et al. | 700/22 |
| 2006/0196714 A1* | 9/2006 | Sugimoto et al. | 180/242 |
| 2007/0233357 A1* | 10/2007 | Sugai et al. | 701/105 |
| 2008/0067973 A1* | 3/2008 | Ishikawa et al. | 320/104 |

FOREIGN PATENT DOCUMENTS

| | | |
|---|---|---|
| JP | A 10-153159 | 6/1998 |
| JP | A 6-351166 | 12/1999 |
| JP | A 2000-125482 | 4/2000 |
| JP | A 2000-204995 | 7/2000 |
| JP | A 2003-169424 | 6/2003 |
| JP | A 2003-244998 | 8/2003 |
| JP | A 2004-112997 | 4/2004 |
| JP | A 2004-168126 | 6/2004 |
| WO | WO 00/62397 A1 | 10/2000 |
| WO | WO 2004/054066 A1 | 6/2004 |

* cited by examiner

ENGINE AND ELECTRIC EQUIPMENT

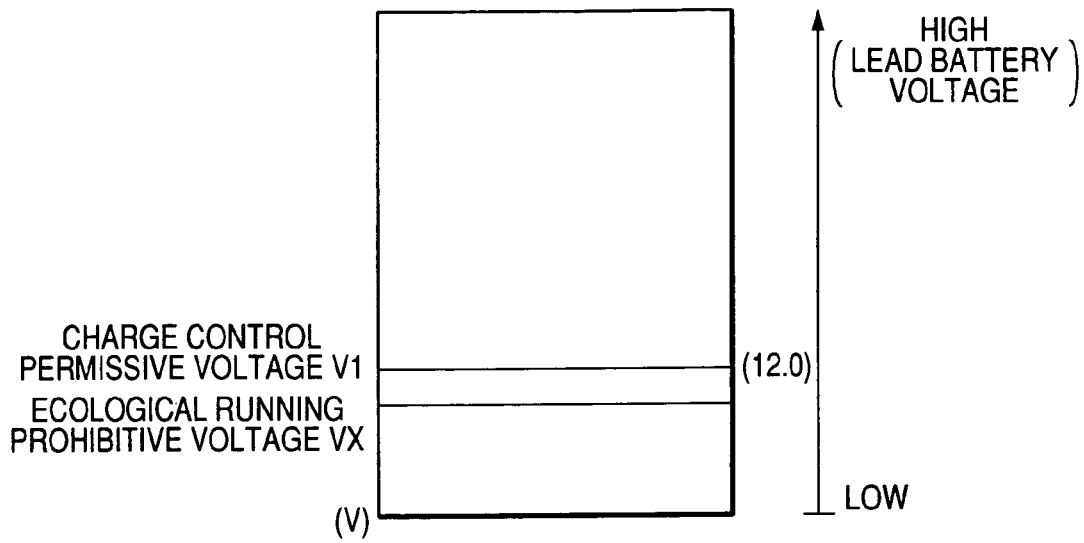
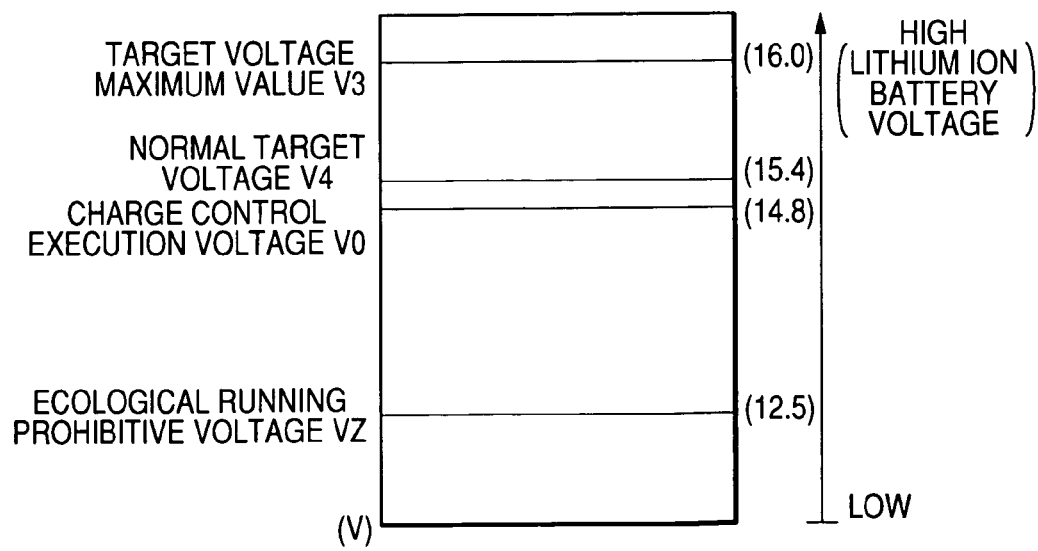

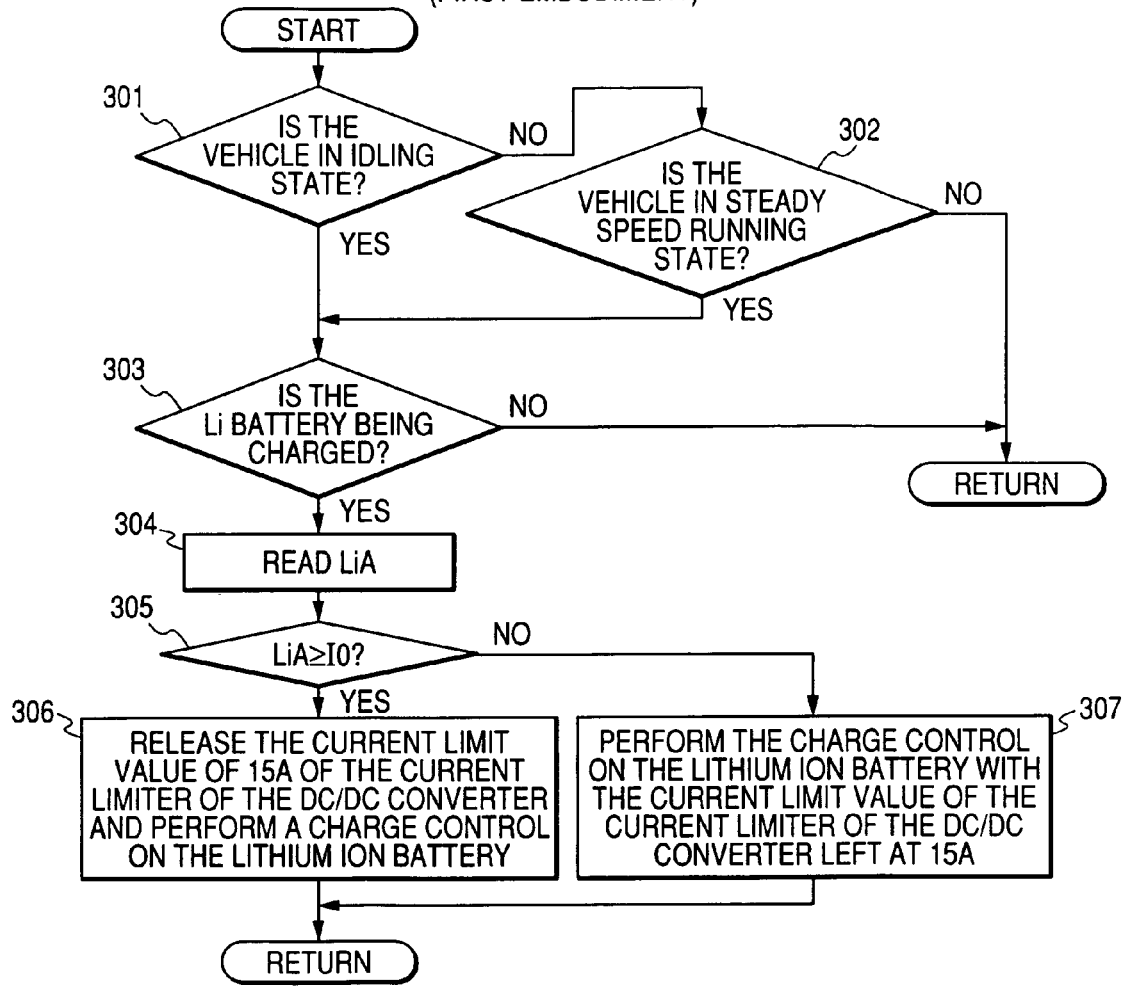
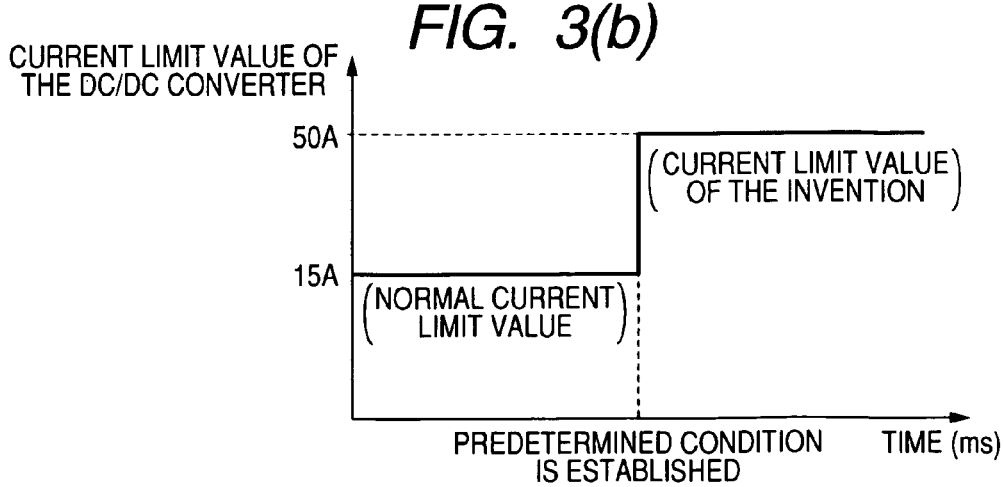

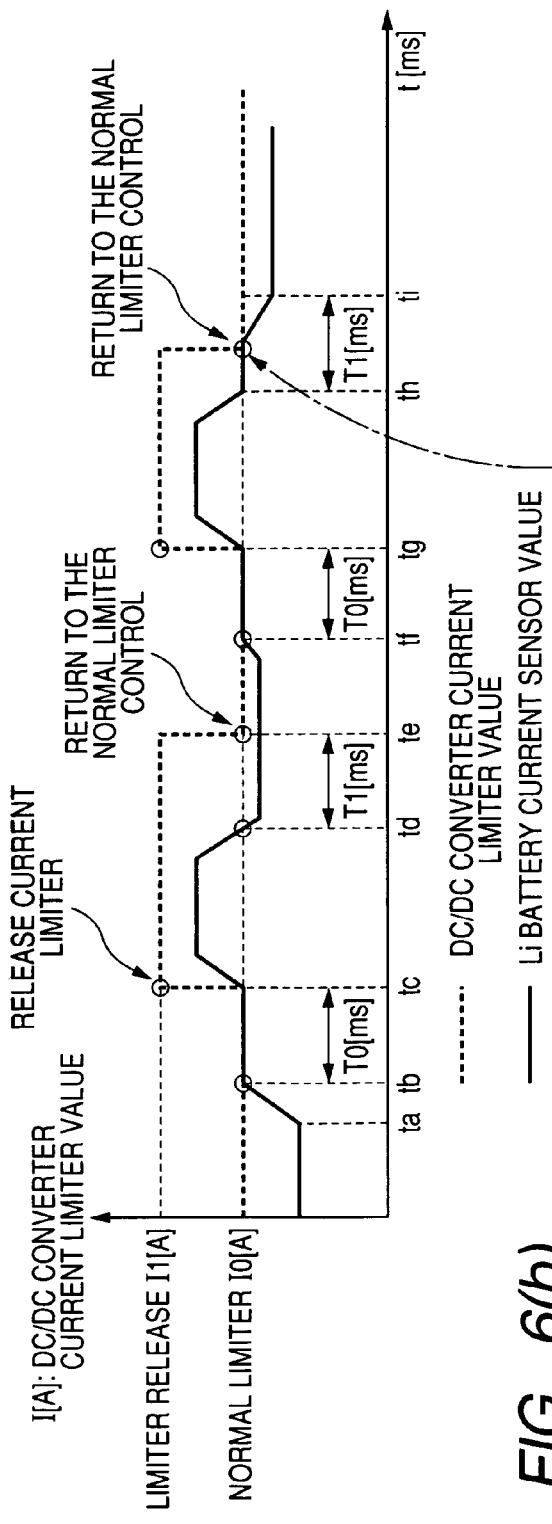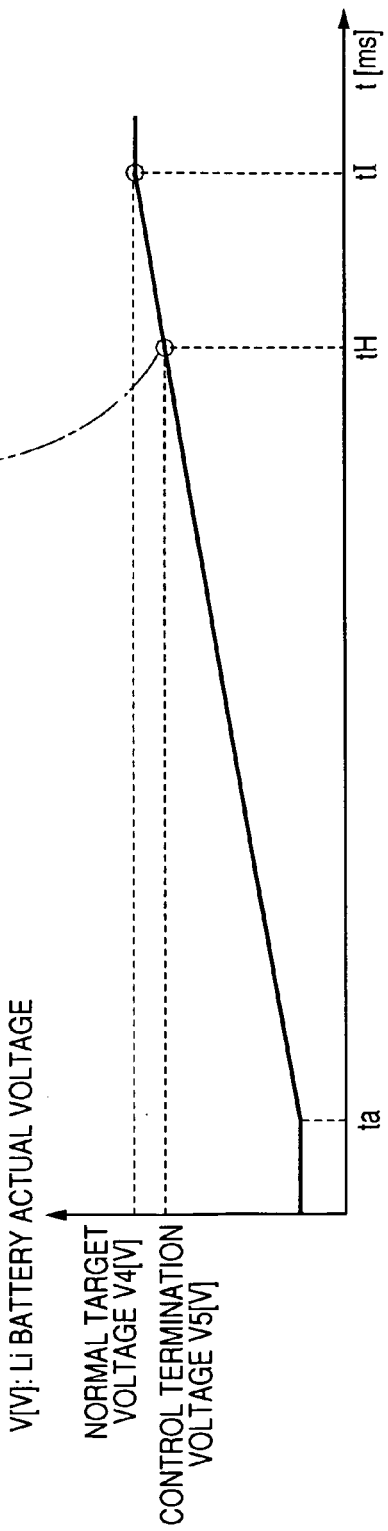
FIG. 6(a)
FIG. 6(b)

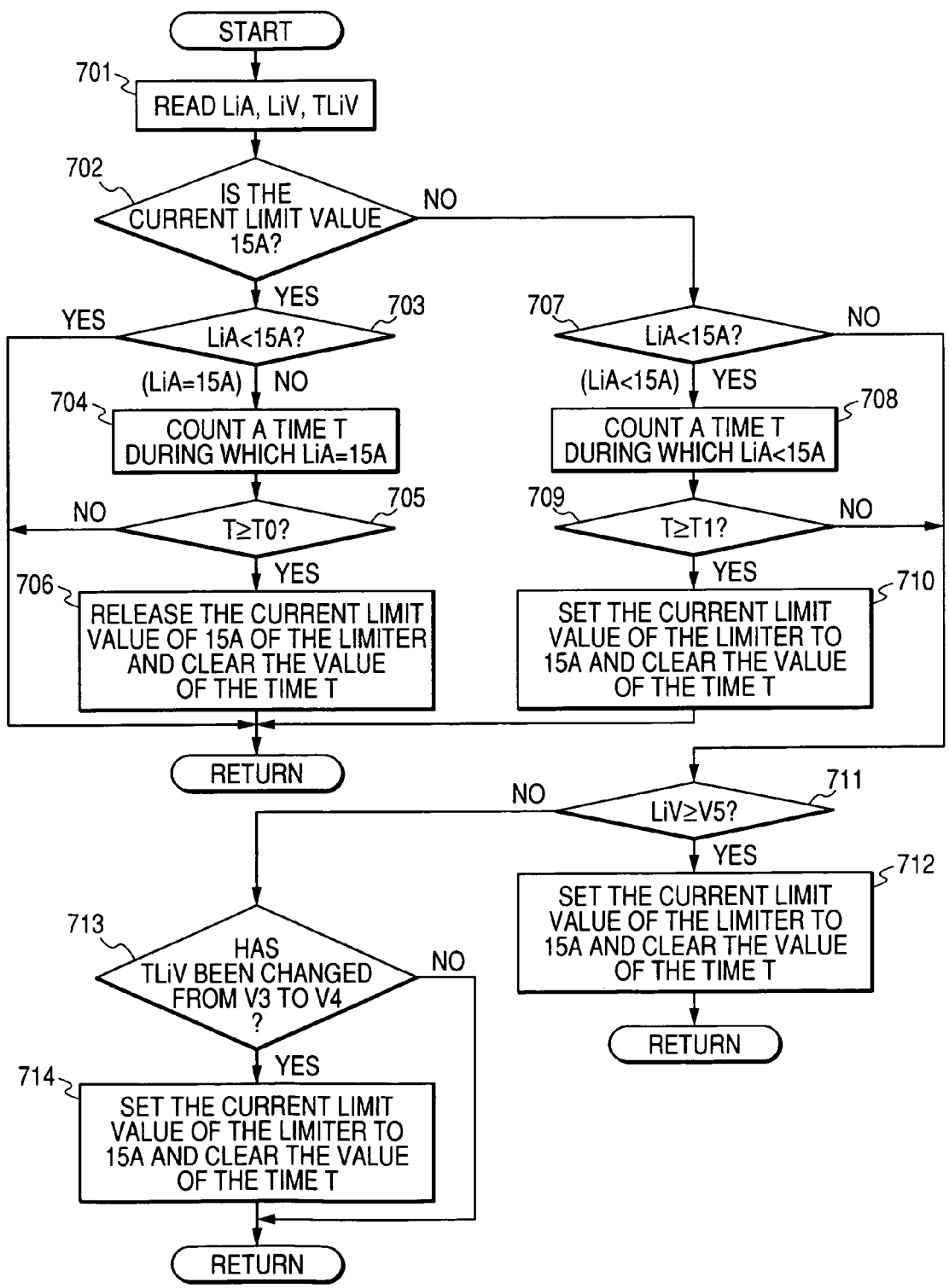

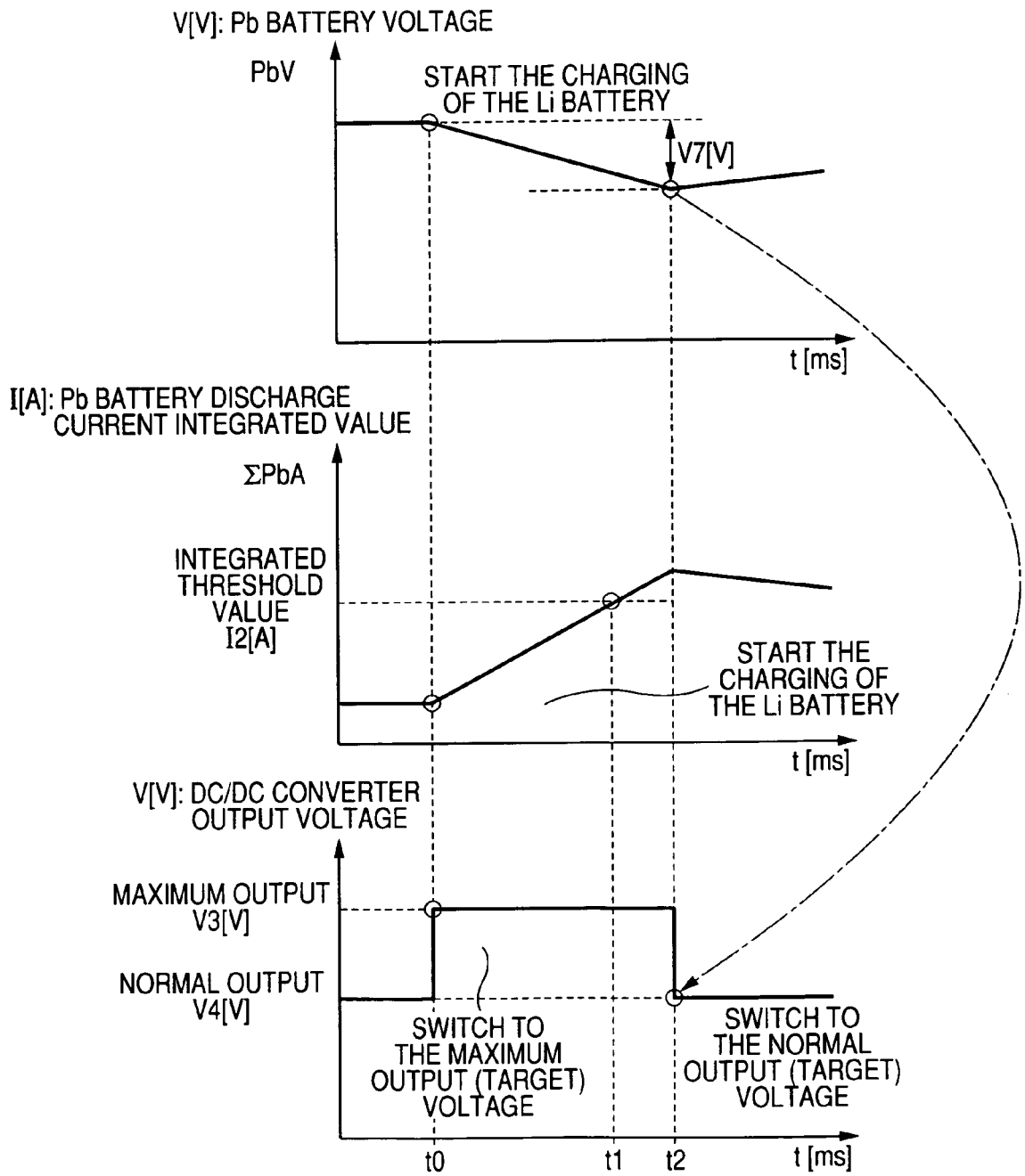

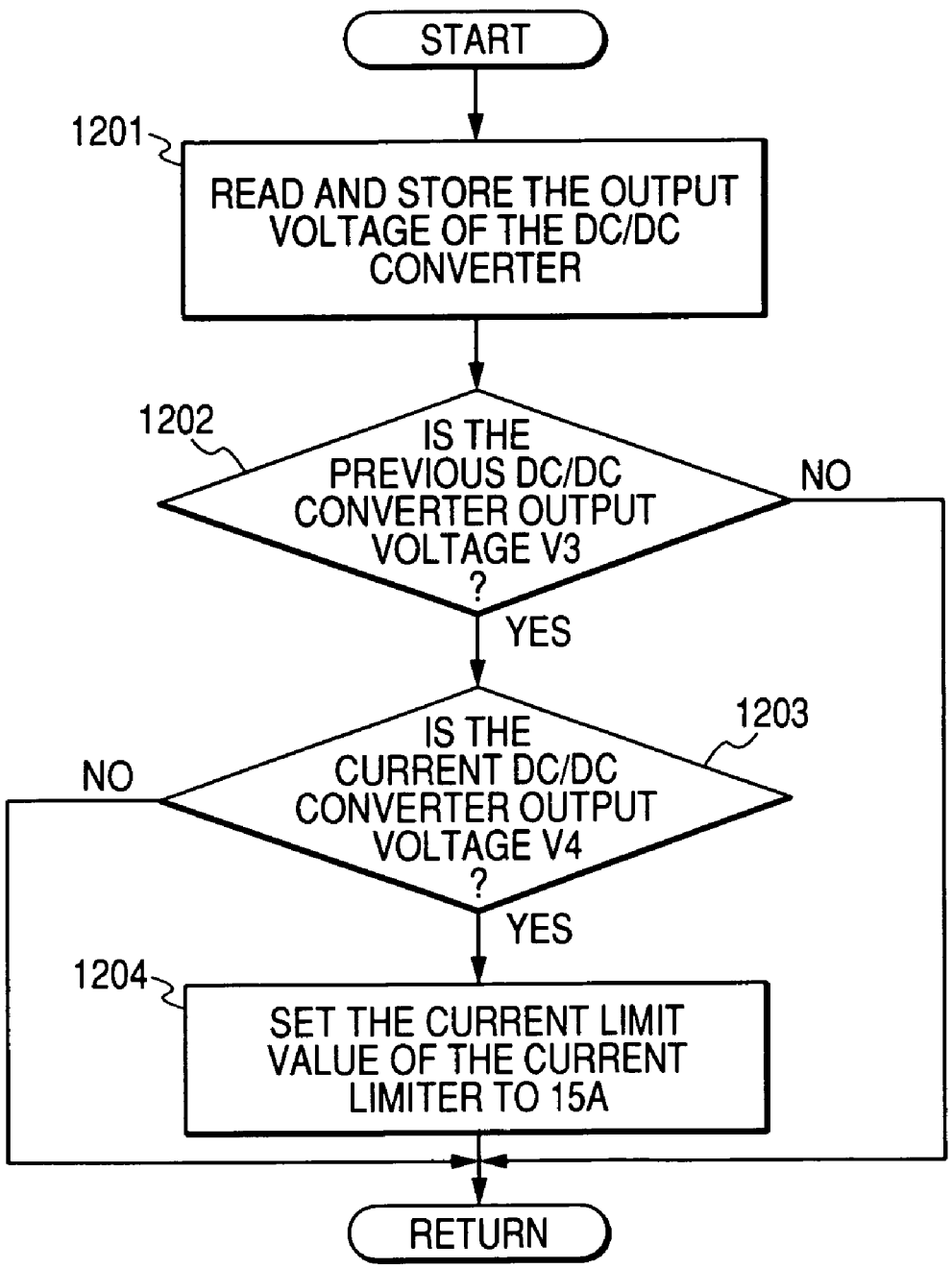

ENGINE CONTROL APPARATUS, CONTROL METHOD AND CONTROL SYSTEM

BACKGROUND OF THE INVENTION

The present information relates to an engine control apparatus, a control method and a control system.

Generally, in a vehicle on which an engine is installed, a starter motor is necessary for starting the engine, and this starter motor is driven by means of a chargeable lead storage battery (hereinafter, the storage battery will be referred to as a battery). In addition, a number of auxiliary machines (electric loads) such as lamps, an air conditioner and electric power window systems which are driven by the battery are installed on the vehicle as electric equipment. Then, in order to recover the battery capacity that has been discharged to start the engine and drive the auxiliary machines, a generator (an alternator) is installed on the vehicle which is driven by the engine to generate electric power so as to charge the battery with electric power so generated.

On the other hand, in the vehicle on which the engine is installed, reducing a fuel consumption relative to a mileage or increasing the fuel economy (hereinafter, referred to as an economical running) constitutes a crucial problem to be solved, and to make this happen, a method is adopted in which the combustion efficiency of the engine is increased, or in order to suppress the wasteful fuel consumption resulting when the vehicle is idled or is under light load, the fuel supply to part of the combustion cylinders is stopped when the vehicle is idled or is under light load. In addition, there occurs a case where the engine is stopped completely for economical running when the vehicle is idled. Furthermore, a vehicle is described in Japanese Patent Publication No. 2000-204995A in which its engine is stopped when the vehicle is idled so as to prevent a battery from becoming flat by controlling an alternator while considering the charged condition of the battery.

Furthermore, a vehicle is described in Japanese Patent Publication NO. 10-153159A in which two batteries of the same type are installed on the vehicle as a battery for starting the engine and a battery for electric equipment and charging power generated by an alternator is properly allocated to the two batteries so as to prevent the batteries from being charged insufficiently to thereby realize the economical running. On the other hand, for an engine having a small number of cylinders, an auxiliary battery such as a lithium ion battery is installed in addition to a normal battery, so that an economical running engine stop is carried out in which the engine stops idling when the vehicle comes to rest. In addition, in an economical running system like this in which two batteries are installed on a vehicle, the applications of a main battery (a lead battery) and an auxiliary battery (a lithium ion battery) are defined as below.

Main battery: to be used as a power supply to the electric loads in such a state that the engine is in operation.

Auxiliary battery: to be used as a power supply to the electric loads in such a state that the engine is not in operation.

Generally, the lead battery having an over 12V output voltage is used for mounting on the vehicle. Meanwhile, the lithium ion batteries having 4V, 8V, 12V, and 16V output voltages respectively are generally used. The lithium ion battery having the 12V output voltage is not suitable as auxiliary battery for mounting on the vehicle. In a case where a lithium ion battery having the 16V output voltage is used as an auxiliary battery, since the output voltage of the lithium ion battery is higher than the output voltage of a main battery, a DC/DC converter becomes necessary which is a voltage regulator for matching the output voltage of the auxiliary battery to the output voltage of the main battery. The DC/DC converter lowers the output voltage of the auxiliary battery when an electric load is driven by the power of the auxiliary battery and raises the output voltage of an alternator when the auxiliary battery is charged with power generated by the alternator.

Normally, a limiter for limiting an output current of the DC/DC converter is incorporated in the DC/DC converter. This limiter is made to be in operation both when the battery is charged while the vehicle is idled and when the battery is charged while the vehicle is driven at constant speed and is made to be released only when the battery is charged while the vehicle is decelerated in order to ensure the output current flowing to the lead buttery when the vehicle accelerate. While a maximum current that the DC/DC converter can supply when the limiter is in operation is, for example, on the order of 15 amperes (hereinafter, referred to as (A), but in the drawings, denoted as A), and a maximum current that the DC/DC converter can supply when the limiter is released is, for example, on the order of 20(A).

In the economical running system on which the two batteries that are configured as has been described above are installed, since a power supply to an electric load during economical running is effected by the lithium ion battery, in the event that the voltage of the lithium ion battery is low, the economical running is prohibited until the lithium ion battery is charged to a high voltage. The charging of the lithium ion battery is carried out by the alternator and the DC/DC converter.

In the twin-battery type economical running system that is configured as has been described above, however, when the lithium ion battery is charged, since the limiter of the DC/DC converter is released only when the battery is charged while the vehicle is decelerated, current that charges the lithium ion battery is not much, leading to a problem that it takes much time to charge the lithium ion battery. Due to this, when the vehicle comes to be idled in such a state that the voltage of the lithium ion battery is low, a long time is needed until an economical running is permitted which is enabled when the voltage of the lithium ion battery is high, leading to a problem that the number of times of permitting the economical running is reduced.

SUMMARY OF THE INVENTION

It is therefore an object of the invention to provide an engine control apparatus, a control method and a control system for the twin-battery type economical running system which can restore the voltage of a second battery to a voltage at which an economical running can be permitted as soon as possible while preventing the voltage of a first battery as the main battery from voltage reduction in the event that the voltage of the second battery is reduced by reviewing the charging method of the second battery and the control method of a current limiter of a voltage regulator.

In order to achieve the above-mentioned object, according to the invention, there is provided an engine control apparatus adapted to be mounted on a vehicle including: a first buttery, supplying power to an electrical load of the vehicle when an engine is in a normal operation; a second buttery, supplying power to the electrical load of the vehicle when the engine is in an economical operation; a voltage regulator regulating voltages of the first buttery and the second buttery; and a current limiter, incorporated in the voltage regulator and limiting a current value flowing from the voltage regulator to the second battery to a limiting value, the engine control apparatus comprising:

an engine stopping unit, stopping the engine when a first predetermined condition is established;

an activator, starting the engine when a second predetermined condition is established;

a current detecting unit, detecting the current value when the second battery is charged; and a changing unit, changing the limiting value between a first limiting value and a second limiting value which is higher than the first limiting value according to the detected current value.

According to the invention, there is also provided an engine control apparatus adapted to be mounted on a vehicle including: a first buttery, supplying power to an electrical load of the vehicle when an engine is in a normal operation; a second buttery, supplying power to the electrical load of the vehicle when the engine is in an economical operation; and a voltage regulator, regulating voltages of the first buttery and the second buttery; the engine control apparatus comprising:

a voltage detecting unit, detecting the voltages of the first buttery and the second buttery; and switching unit, switching a target voltage value of the second buttery from a first voltage value to a second voltage value which is higher than the first voltage value when the second battery is charged in a case where the voltage of the second battery is no more than a second predetermined value and the voltage of the first battery is no less than a first predetermined value.

The engine control apparatus may further comprises:

a voltage detecting unit, detecting the voltages of the first buttery and the second buttery; and switching unit, switching a target voltage value of the second buttery from a first voltage value to a second voltage value which is higher than the first voltage value in a case where the voltage of the second battery is no more than a second predetermined value and the voltage of the first battery is no less than a first predetermined value.

According to the invention, there is also provided an engine control method for an vehicle adapted to include; a first buttery, supplying power to an electrical load of the vehicle when an engine is in a normal operation; a second buttery, supplying power to the electrical load of the vehicle when the engine is in an economical operation; a voltage regulator regulating voltages of the first buttery and the second buttery; and a current limiter, incorporated in the voltage regulator and limiting a current value flowing from the voltage regulator to the second battery to a limiting value, the engine control method comprising:

stopping the engine when a first predetermined condition is established;

starting the engine when a second predetermined condition is established;

detecting the current value when the second battery is charged; and changing the limiting value between a first limiting value and a second limiting value which is higher than the first limiting value according to the detected current value.

According to the invention, there is also provided an engine control system adapted to be mounted on a vehicle including: a first buttery, supplying power to an electrical load of the vehicle when an engine is in a normal operation; a second buttery, supplying power to the electrical load of the vehicle when the engine is in an economical operation; a voltage regulator regulating voltages of the first buttery and the second buttery; and a current limiter, incorporated in the voltage regulator and limiting a current value flowing from the voltage regulator to the second battery to a limiting value, the engine control apparatus comprising:

an engine stopping unit, stopping the engine when a first predetermined condition is established;

an activator, starting the engine when a second predetermined condition is established;

a current detecting unit, detecting the current value when the second battery is charged; and a changing unit, changing the limiting value between a first limiting value and a second limiting value which is higher than the first limiting value according to the detected current value.

In the related art economical running system employing two batteries, if the voltage of the second battery is lower than the second predetermined value, the function of charging the second battery is not performed except the case of decreasing the speed of a vehicle so that the engine for economical running is not stopped. Therefore, in the related art economical running system employing two batteries, the gas mileage may not be improved. However, according to the present invention, even if a voltage of the second battery is lower than the second predetermined value, the function of charging the second battery is performed under the conditions other than the case of decreasing the speed of a vehicle. Therefore, the voltage of the second battery may be restored in an early stage so that the engine for economical running may be stopped and accordingly, the gas mileage may be improved.

BRIEF DESCRIPTION OF THE DRAWINGS

The above objects and advantages of the present invention will become more apparent by describing in detail preferred exemplary embodiments thereof with reference to the accompanying drawings, wherein:

FIG. 2a is an explanatory diagram which shows an charge control permissive voltage and an economical running prohibitive voltage of a lead battery, and FIG. 2b is an explanatory diagram which explains the meaning of a voltage in a lithium ion battery;

FIG. 3a is a flowchart of a first embodiment of the invention which shows an embodiment of a procedure for a current limit control by a DC/DC converter, and FIG. 3b is a time chart which shows a transition of a current limit value of the DC/DC converter according to the control procedure in FIG. 3a;

FIG. 4b is a time chart which shows a transition of a output voltage of the DC/DC converter according to the control procedure in FIG. 4a;

FIG. 6 is a time chart of a fourth embodiment of the invention which shows transitions of charge current to the lithium ion battery and a current limit value;

FIG. 7 is a flowchart which shows a control procedure shown in the time chart in FIG. 6;

FIG. 8a is a flowchart which shows a first mode of a control procedure for the output voltage of the DC/DC converter when the lithium ion battery is charged in a fifth embodiment of the invention and FIG. 8b is a time chart which shows transitions of the voltage value of the lithium ion battery and the output voltage of the DC/DC converter in the control shown in FIG. 8a;

FIG. 9a is a flowchart which shows a second mode of a control procedure for the output voltage of the DC/DC converter when the lithium ion battery is charged in a sixth embodiment of the invention and FIG. 9b is a time chart which shows transitions of the voltage value of the lithium ion battery and the output voltage of the DC/DC converter in the control shown in FIG. 9a, and FIG. 9c is a time chart which shows a transition of the output voltage of the DC/DC converter when the voltage value of the lead battery is low in the control shown in FIG. 9a;

FIG. 10a is a flowchart which shows a third mode of a control procedure for the output voltage of the DC/DC converter when the lithium ion battery is charged in a seventh embodiment of the invention and FIG. 10b is a time chart which shows transitions of the voltage value of the lithium ion battery and the output voltage of the DC/DC converter in the control shown in FIG. 10a;

FIG. 11 is a time chart of an eighth embodiment of the invention which shows a fourth mode of a control procedure of the output voltage of the DC/DC converter when the lithium ion battery is charged;

FIG. 12 is a flowchart of a ninth embodiment of the invention which shows a procedure in which the control procedure for the output voltage of the DC/DC converter when the lithium ion battery is charged is combined with a limiter control of the DC/DC converter;

DETAILED DESCRIPTION OF THE EMBODIMENTS

Hereinafter, a mode for carrying out the invention will be described in detail based on specific embodiments while referring to the accompanying drawings.

Figure 1:
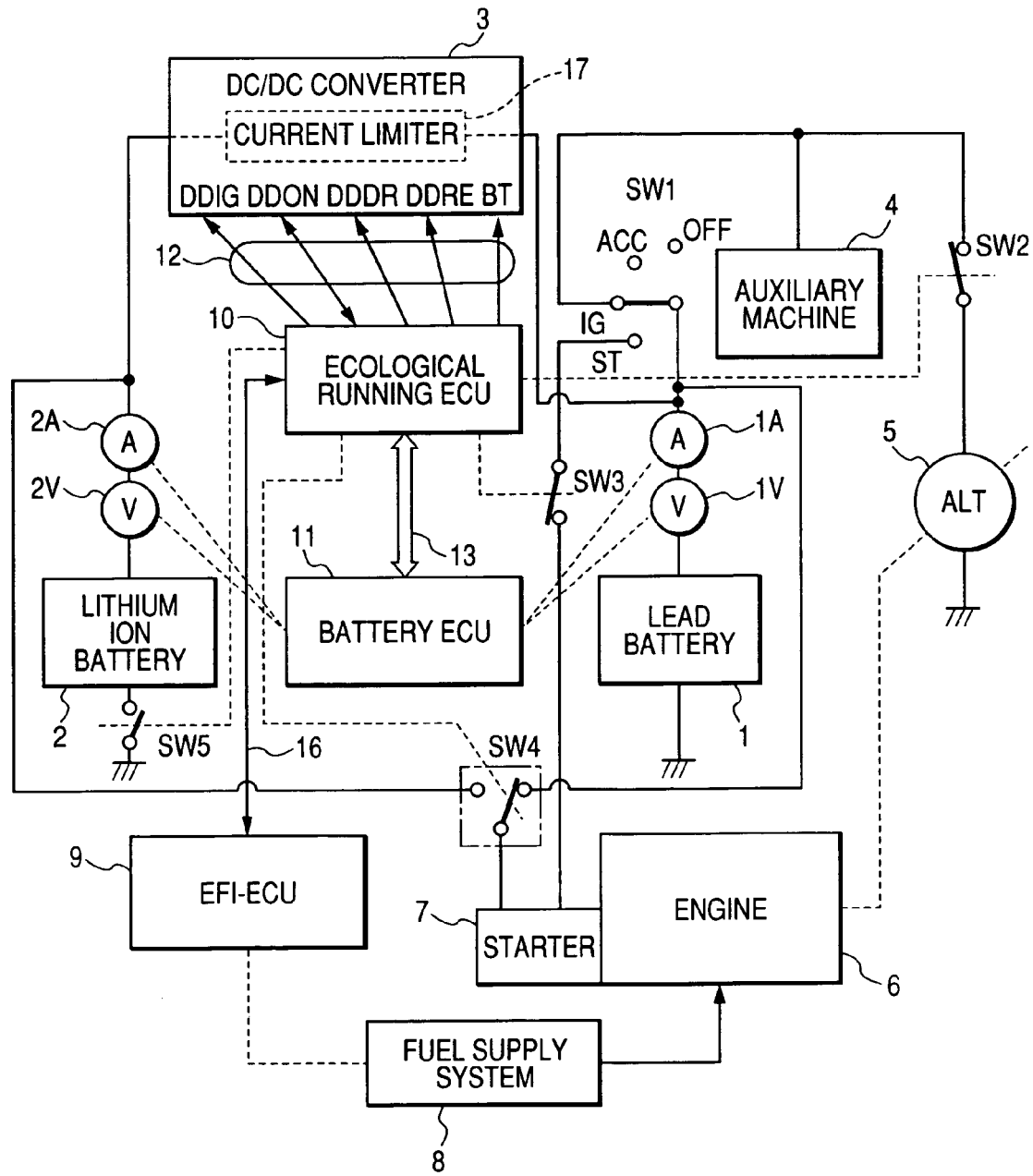
FIG. 1 is a configuration diagram which shows an embodiment of a configuration including an engine and an auxiliary machine as electric equipment to which the invention is applied.

FIG. 1 is such as to show the configuration of an embodiment of an automatic engine stop/start control apparatus of the invention, and an engine 6 is such as to be installed on a vehicle. In addition, electric equipment is an auxiliary machine 4 that is installed on the vehicle, and an electric load such as a starter motor 7 for starting the engine 6, lamps or an air conditioner, or a motor for opening and closing a window glass which uses a lead battery 1 as its power supply corresponds to the auxiliary machine 4. The lead battery 1 is connected to the auxiliary machine 4 when an ignition switch SW1 is on (in an IG position) and is also connected to an alternator 5 which generates power with which the lead battery 1 is charged. An ammeter 1A, a voltmeter 1V and the ignition switch SW1 are provided on a circuit between the lead battery 1 and the auxiliary machine 4. In addition, a switch SW2 is provided between the lead battery 1 and the alternator 5, and the starter 7 is made to start the engine 6 automatically when the ignition switch SW1 is put in a starter position and a starter switch SW3 is on. An economical running ECU can start the engine 6 automatically by causing the starter switch SW3 to be switched on.

On the other hand, in addition to the lead battery 1, a lithium ion battery 2 is installed on this vehicle. In general, since the output voltage of the lead battery 1 is over 12V, while the output voltage of the lithium ion battery 2 is 16V, the lithium ion battery 2 cannot be connected to the lead battery 1 in parallel as they are. Then, a DC/DC converter 3 is connected to the lithium ion battery 2, and this DC/DC converter 3 lowers the output voltage of 16V to 13V which is slightly higher than the output voltage of the lead battery 1 when power is supplied from the lithium ion battery 2 and raises the output voltage of 12V of the alternator 5 to 16V when the lithium ion battery 2 is charged by the alternator 5. In this embodiment, an ammeter 2A and a voltmeter 2V are provided at an output of the lithium ion battery 2, and a switch SW5 is provided to an earth side of the lithium ion battery 2. In addition, the switch SW5 provided to the earth side of the lithium battery 2 is made to be switched on and off by the economical running ECU 10.

On the other hand, in the twin-power-supply installed economical running system on which the lead battery 1 and the lithium ion battery 2 are installed as has been described above, the starter 7 is started by the lead battery 1 for engine start (with an ignition key) except for cold start and start from an engine stop for economical running, and when the engine is started from the economical running engine stop state, the starter 7 is started by the lithium ion battery 2. Due to this, in this embodiment, the starter motor 7 is connected to the lead battery 1 and the lithium ion battery 2 via a starter power supply changeover switch SW4.

In addition, in this embodiment, an ECU for electronically controlling fuel injection (in the figure, described as EFI-ECU) 9, the economical running ECU 10 for stopping and starting the engine 6 for economical running and a battery ECU 11 correspond to control units for driving the engine 6 and the auxiliary machine 4 which is electric equipment. The engine 6 installed on the vehicle is controlled by the EFI-ECU 9 and is supplied with fuel from a fuel supply system 8. In addition, the economical running ECU 10 is connected to the EFI-ECU 9 via a bus 16, is connected to the DC/DC converter 3 via a bus 12 and is connected to the battery ECU 11 via a bus 13.

A current limiter 17 is incorporated in the DC/DC converter 3 which can limit the value of current which flows through the DC/DC converter 3 by an external signal. In addition, in this embodiment, five input terminals DDIG, DDON, DDDR, DDRE, and BT are provided on the DC/DC converter 3 to which signals from the economical running ECU 10 are inputted.

The input terminal DDIG is a power supply terminal, to which power supply for operating the DC/DC converter 3 is inputted. A signal which determines whether or not the DC/DC converter 3 is activated is inputted to the input and output terminal DDON. When an ON signal is inputted to the input and output terminal DDON, the DC/DC converter 3 starts to operate, whereas an OFF signal is inputted thereto, the DC/DC converter 3 is rendered inoperable. A signal which determines the output direction of the DC/DC converter 3 is inputted to the input terminal DDDR, and depending on a signal so inputted, it is determined whether current is outputted in a direction where the lead battery 1 exists or in a direction where the lithium ion battery 2 exists. A signal which determines on the operation of the incorporated current limiter 17 is inputted to the input terminal DDRE. For example, when an ON signal is inputted to the input terminal DDRE, the current limiter 17 is allowed to output a maximum current of 50(A), whereas when an OFF signal is inputted thereto, current flowing through the current limiter 17 is restricted, and hence, the current limiter 17 is only allowed to output a maximum current of 15(A). A signal which determines on the magnitude of voltage that is outputted from the DC/DC converter 3 is inputted to the input terminal BT.

The battery ECU 11 detects a state of the battery from detection values of the ammeters 1A, 2A and the voltmeters 1V, 2V so as to perform charging and discharging controls over the lithium ion battery 2 and the lead battery 1 in cooperation with the EFI-ECU 9 and the economical running ECU 10. For example, in a case where the charge rate of the lithium ion battery 2 is less than 50%, the battery ECU 11 outputs a signal to terminal DDDR of the DC/DC converter 3 through the economical running ECU 10 so that the current output from the DC/DC converter 3 is oriented to the lithium ion battery 2. In addition, the economical running ECU 10 controls the switches SW2 to SW5 except for the ignition switch SW1 to be on and off.

In this embodiment, while the engine is stopped for economical running, power is not supplied to the auxiliary machine 4 from the lead battery 1 but is supplied thereto from the lithium ion battery 2 in order to prevent the deterioration of the lead battery 1. As this occurs, the switch SW5 is switched on by the economical running ECU 10, and the output voltage of the lithium ion battery 2 is applied to the ignition switch SW1 via the DC/DC converter 3. In addition, since a voltage from the lithium ion battery 2 via the DC/DC converter 3 is higher than the output voltage of the lead battery 1, power is not supplied from the lead battery 1 to the auxiliary machine 4 in this state but is supplied thereto from the lithium ion battery 2.

In addition, when the economical running engine stop is ceased to restart the engine, the starter power supply changeover switch SW4 is switched to the lithium ion battery side, so that power is supplied from the lithium ion battery 2 directly to the starter motor 7 not via the DC/DC converter 3 but through the starter power supply changeover switch SW4. On the other hand, power that the DC/DC converter 3 can supply is limited, and when the auxiliary machine 4 is driven by the lithium ion battery 2, in the event that the auxiliary machine 4 is put under a highly loaded state and comes to require more current than the maximum current supply capacity (50 amperes) of the DC/DC converter 3, since a required power supply to the auxiliary machine 4 cannot be available only from the lithium ion battery 2, the lead battery 1 is also used in parallel with the lithium ion battery 2 to meet the required power supply.

FIG. 2(a) illustrates a charge control permissive voltage V1 of the lead battery, at which the lithium ion battery comes to be chargeable, and an economical running prohibitive voltage VX of the lead battery. FIG. 2(b) illustrates a voltage in terms of controlling the lithium ion battery. The operation of controlling the charge of the lithium ion battery may be performed when the voltage of the lead battery is greater than or equal to a voltage V1. In addition, when the voltage of the lead battery is less than or equal to the economical running prohibitive voltage VX, the operation of economical running is prohibited. For example, the value of the charge control permissive voltage V1 of the lead battery, at which the lithium ion battery comes to be chargeable, is approximately 12 volts. The value of the economical running prohibitive voltage VX is approximately 11.8 volts in general. However, the value of the economical running prohibitive voltage VX may vary according to temperature.

Further, voltage values V3, V4, V0 and VZ in order of the magnitude are assigned to the lithium ion battery. The voltage value V3 is the maximum value of a target voltage to which the lithium ion battery is to be charged. For example, the voltage value V3 may correspond to 16.0 volts. The voltage value V4 is an ordinary voltage value of the target voltage to which the lithium ion battery is to be charged. The voltage value V0 is for performing a control operation for converting a limiter value (in other words, a voltage value for performing a control operation for charging the lithium ion battery). For example, the voltage value V0 may correspond to 14.8 volts. In addition, the voltage value VZ is the economical running prohibitive voltage VX. For example, the economical running prohibitive voltage VZ may correspond to 12.5 volts.

In the following description, the voltage of the lead battery 1 is denoted by PbV, current which flows from or which is charged to the lead battery 1 is by PbA, the voltage of the lithium ion battery 2 is by LiV, and current which flows from or which is charged to the lithium ion battery 2 is by LiA. In addition, in the drawings, there are cases where the lead battery 1 is briefly described as Pb and the lithium ion battery as Li. Furthermore, in the drawings, ampere (A) which is the unit of current is simply described as A.

In the configuration shown in FIG. 1, the economical running which is effected by stopping the engine 6 by means of the EFI-ECU 9, the economical running ECU 10 and the battery ECU 11 will be executed in the following procedure. When the economical running is effected, the economical running is executed when economical running conditions are met completely such as the vehicle is idled while stopped.

When the economical running is performed, the voltage PbV and the current PbA of the lead battery 1, and the voltage LiV and the current LiA of the lithium ion battery 2 are detected. When the voltage LiV of the lithium ion battery 2 is greater than or equal to the economical running prohibitive voltage VZ shown in FIG. 2(b) and the voltage PbV of the lead battery 1 is greater than or equal to the economical running prohibitive voltage VX, economical running is performed so that an engine 6 may be stopped. When the voltage LiV of the lithium ion battery 2 is less than the economical running prohibitive voltage VZ, or the voltage PbV of the lead battery 1 is less than the economical running prohibitive voltage VX, economical running is not performed.

Since power is supplied to the electric load by the lithium ion battery 2 while the economical running is executed as has been described above, in the event that the economical running is repeated several times, the voltage of the lithium ion battery 2 is dropped to be lower than the charge control execution voltage V0, approaching the economical running prohibitive voltage VZ. As this occurs, the lithium ion battery 2 needs to be charged with good efficiency. The invention is such that the charge control of the lithium ion battery is carried out in a case where the voltage LiV of the lithium ion battery 2 is less than or equal to the voltage of V0, and the voltage PbV of the lead battery 1 is greater than or equal to the charge control permissive voltage V1, so as to control the lithium ion battery 2 to be charged with good efficiency, and a mode for carrying out the invention will be described below based on several embodiments. Control procedures which will be described using flowcharts are to be executed every predetermined period of time.

FIG. 3(a) is such as to show a first embodiment of the invention and shows specifically a current limitation control by the DC/DC converter in the charge control on the lithium ion battery. In this embodiment, the current limit value of the current limiter incorporated in the DC/DC converter is changed according to a value of current which flows into the side of the lithium ion battery 2 while the lithium ion battery is charged, with the voltage value LiV of the lithium ion battery being equal to or smaller than V0 and the voltage value PbV of the lead battery 1 being equal to or larger than V1. In addition, FIG. 3(b) is a time chart which shows a transition of the current limit value of the DC/DC converter according to a control procedure shown in FIG. 3(a).

Note that in the embodiment shown in FIG. 3(a), an example will be described in which the current limit value of the current limiter incorporated in the DC/DC converter is released in the event that the value of current which flows into the side of the lithium ion battery exceeds a reference current value. Namely, an example will be described in which a normal current limit value of 15(A) of the DC/DC converter is released so as to allow current to flow up to a maximum current value of 50(A) of the DC/DC converter.

In step 301, whether or not the engine is being idled is determined, and if it is determined that the engine is being idled, proceed to step 303, whereas if it is determined that the engine is not being idled, proceed to step 302, where whether or not the vehicle is being operated in a constant speed running state is determined. Then, if the vehicle is not in the constant speed running state, this routine ends. If the vehicle is in the constant speed running state, however, proceed to step 303. In step 303, whether or not the lithium battery is being charged is determined, and if the battery is not being charged, this routine ends. If the lithium battery is being charged, however, proceed to step 304.

In step 304, a value of charge current LiA to the lithium ion battery is read from the sensor 2A shown in FIG. 1, and in the following step 305, whether or not the value of charge current LiA to the lithium ion battery so read is equal to or larger than a reference current value I0 is determined. Then, if LiA≧I0, proceed to step 306, where the normal current limit value of 15(A) of the DC/DC converter is released, and a charge control on the lithium ion battery is carried out. Namely, the current limit value of the limiter incorporated in the DC/DC converter, which is described in FIG. 1, is raised from the normal current limit value of 15(A) to the current limit value of 50(A) of the invention to execute the control. This state is shown in FIG. 3(b).

On the contrary, if the determination in step 305 results in LiA≦I0, proceed to step 307, the charge control on the lithium ion battery is carried out while the normal current limit value of the DC/DC converter is left as it is. When the steps 306, 307 are completed, this routine ends. In the first embodiment, since an output voltage of the DC/DC converter resulting when the predetermined condition is established while the lithium ion battery is charged becomes larger than one resulting while the lithium ion battery is charged normally, the lithium ion battery can be charged completely in a short period of time compared to the related-art case. As a result, the frequency of occurrence of the economical running is increased to thereby improve the fuel economy.

Figure 4A:
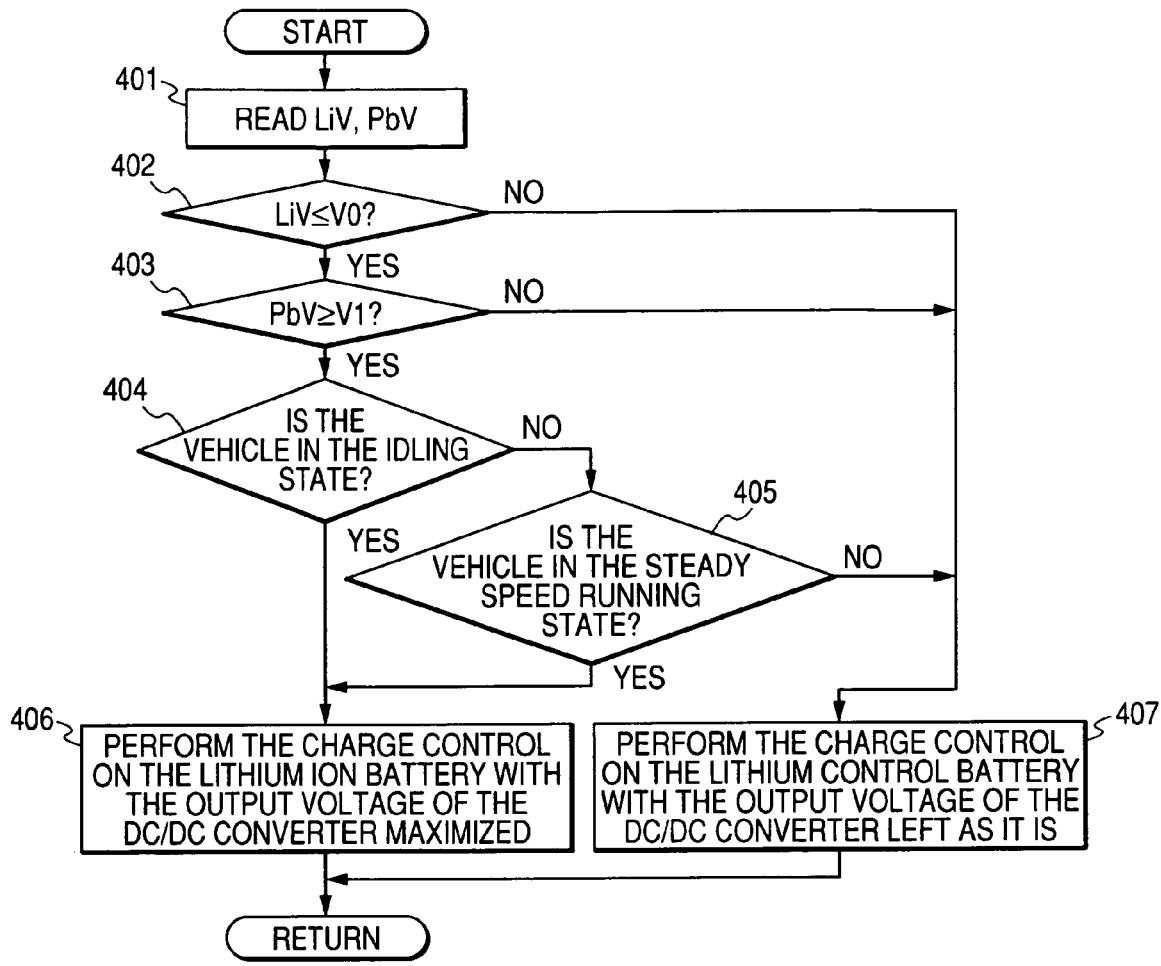
FIG. 4a is a flowchart of a second embodiment of the invention which shows an embodiment of a procedure for an output voltage control of a DC/DC converter.
Figure 4B:
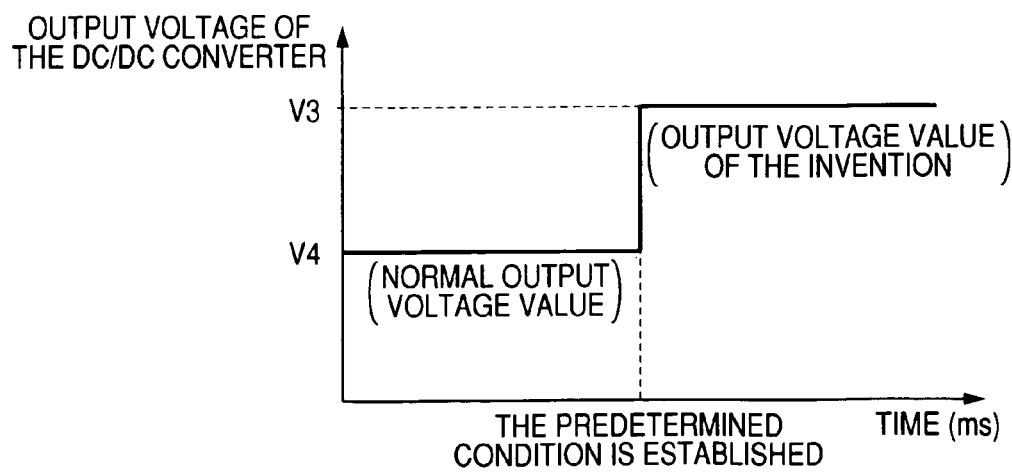

FIG. 4(a) is such as to show a second embodiment of the invention and shows specifically an output voltage control by the DC/DC converter in the charge control on the lithium ion battery. In this embodiment, a target charge voltage value TLiV of the lithium ion battery is changed from the normal target voltage V4 to the target voltage maximum value V3 or the output voltage maximum value V3 of the DC/DC converter so as to reduce the charging time of the lithium ion battery while the lithium ion battery is charged, with the voltage value LiV of the lithium ion battery 2 being equal to or larger than the charge control execution voltage V0 and with the voltage value PbV of the lead battery 1 being equal to or larger than the charge control permissive voltage V1. In Addition, FIG. 4(b) is a time chart which shows a transition of the output voltage of the DC/DC converter according to a control procedure shown in FIG. 4(a).

In step 401, the voltage value LiV of the lithium ion battery and the voltage value PbV of the lead battery are read. In the following step 402, whether or not the voltage value LiV of the lithium ion battery 2 is equal to or smaller than V0 is determined, and if LiV≦V0, proceed to step 403, whereas if LiV>V0, proceed to step 407. In step 403, whether or not the voltage value PbV of the lead battery 1 is equal to or larger than V1 is determined. If PbV≧V1, proceed to step 404, and if PbV<V1, proceed to step 407.

In step 404, whether or not the engine is being operated in an idling state is determined, and if the engine is in the idling state, proceed to step 406, whereas if the engine is not in the idling state, proceed to step 405, where whether or not the vehicle is in the constant speed running state is determined. Then, if the vehicle is not in the steady speed running state, proceed to step 407, whereas if the vehicle is in the steady speed running state, proceed to step 406. In step 406, the output voltage of the DC/DC converter is changed from the normal output voltage value V4 to the output voltage value of the invention, that is, the output voltage maximum value V3 of the DC/DC converter so as to carry out the charge control on the lithium ion battery. This state is shown in FIG. 4(b).

On the other hand, in step 407 to which the routine proceeds if LIV>V0 in step 402, if PbV<V1 in step 403 or if the vehicle is determined not to be in the steady speed running state in step 405, the charge control is carried out on the lithium ion battery while the output voltage of the DC/DC converter remains at the normal output voltage value V4. When the steps 406, 407 are completed, this routine ends. In the second embodiment, since, an output voltage of the DC/DC converter resulting when the predetermined condition is established while the lithium ion battery is charged becomes larger than one resulting while the lithium ion battery is charged normally, the target charge voltage value TLiV of the lithium ion battery becomes large, and hence, the lithium ion battery can be charged completely in a short period of time compared to the related-art case. As a result, the frequency of occurrence of the economical running is increased to thereby improve the fuel economy.

Figure 5:
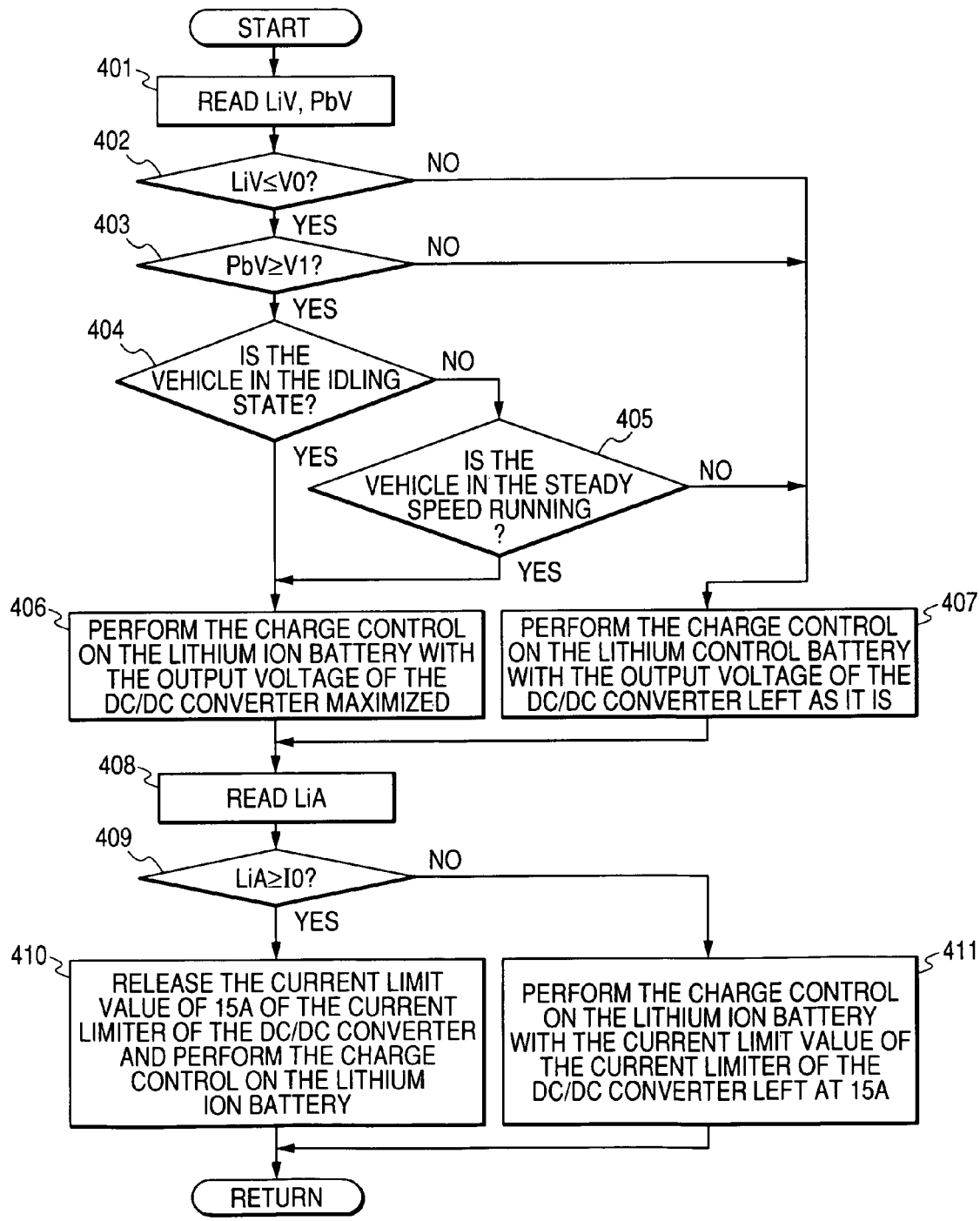
FIG. 5 is a flowchart of a third embodiment of the invention which shows an embodiment of a procedure for controlling the charge of the lithium ion battery.

FIG. 5 is such as to show a third embodiment of the invention and shows specifically a control resulting from a combination of the first and second embodiments in the charge control on the lithium ion battery. In this embodiment, firstly, the output voltage control by the DC/DC converter of the second embodiment which is described by reference to FIG. 4(a) is carried out, and thereafter, the current limitation control by the DC/DC converter of the first embodiment which is described by reference to FIG. 3(a) is carried out. In the third embodiment, since a control procedure from step 401 to 407 is completely identical with the control procedure described in FIG. 4(a), like step numbers will be imparted to like steps, so as to omit the description thereof.

While in the second embodiment, the routine ends when the steps 406, 407 are completed, in the third embodiment, when steps 406, 407 are completed, the routine proceeds to step 408. In step 408, a value of charge current LiA to the lithium ion battery is read from the sensor 2A shown in FIG. 1, and in the following step 409, whether or not the value of charge current LiA to the lithium ion battery so read is equal to or larger than the reference current value I0 is determined.

Then, if LiA≧I0, proceed to step 410, where the normal current limit value of 15(A) of the DC/DC converter is released, and a charge control on the lithium ion battery is carried out. Namely, the current limit value of the limiter incorporated in the DC/DC converter, which is described in FIG. 1, is raised from the normal current limit value of 15(A) to the current limit value of 50(A) of the invention to execute the control. On the contrary, the determination in step 409 results in LiA<I0, proceed to step 411, where the charge control on the lithium ion battery is carried out while the normal current limit value of 15(A) of the DC/DC converter is left as it is. When the steps 410, 411 are completed, this routine ends.

In the third embodiment, since, when the predetermined condition is established while the lithium ion battery is charged, the value of a voltage outputted then from the DC/DC converter becomes large and the value of a current which flows into the lithium ion battery through the DC/DC converter becomes large compared to those resulting while the lithium ion battery is charged normally, the lithium ion battery can be charged completely in a short period of time compared to the related-art case. As a result, the frequency of occurrence of the economical running is increased to thereby improve the fuel economy.

While, in the first embodiment, the example is described in which the current limit value of the current limiter of the DC/DC converter is released when the value of current which flows through the DC/DC converter becomes equal to or larger than I0, in reality, in the event that a state where the value of current which flows through the DC/DC converter equals the normal current limit value I0 continues for a predetermined period of time or longer, the current limit value of the current limiter of the DC/DC converter is released, and in the event that a state where the value of current which flows through the DC/DC converter lowers below the normal current limit value I0 continues for a predetermined period of time or longer, the current limiter of the DC/DC converter is restored to operate its normal limiter control. This control will be made to constitute a fourth embodiment of the invention and will be described using time charts in FIGS. 6(a), 6(b) and a flowchart in FIG. 7.

FIG. 6(a) is such as to show a sensor value which indicates an actual current detected by the current sensor as flowing through the DC/DC converter, the normal limitation value of the current limiter of the DC/DC converter and the maximum current value of the DC/DC converter which results when the limiter is released. In addition, FIG. 6(b) is such as to show a transition of the voltage of the lithium ion battery while the lithium ion battery is charged. In this embodiment, a case will be described where the lithium ion battery is started to be charged at a time ta.

When the charging of the lithium ion battery is started at the time ta, the value of current flowing through the DC/DC converter gradually increases and reaches, at a time tb, the current value I0 which is the normal current limit value of the current limiter. The value of this current value I0 is 15(A), for example. In the event that this state continues by a duration of T0(ms), the current limit value of the limiter of the DC/DC converter is released at a time tc which is a time resulting after the duration of T0 has elapsed since the time tb. As a result, current up to a maximum current I1 can flow through the DC/DC converter. The value of the maximum current I1 is 50(A), for example.

When the current limit value of the current limiter of the DC/DC converter is released at the time tc, the value of current flowing through the DC/DC converter increases. Thereafter, while the value of current flowing through the DC/DC converter continues to exceed the current limit value I0 for a certain period of time, thereafter, the current value lowers below the current limit value I0 at a time td. When this state continues by a duration of time T1(ms), the current limiter of the DC/DC converter is restored to operate its normal limiter control at a time te which is a time resulting when the duration of time T1 has elapsed since the time td, and the current limit value I0 is set.

Assuming that thereafter, the value of current flowing through the DC/DC converter increases again and reaches, at a time tf, the current value I0 which is the normal current limit value of the current limiter and this state continues by the duration of T0(ms). Then, the current limit value of the limiter of the DC/DC converter is released at a time tg which is a time resulting when the duration of time T0 has elapsed since the time tf, whereby the state is restored where current up to the maximum current I1 can flow through the DC/DC converter again.

When the current limit value of the current limiter of the DC/DC converter is released at the time tg, the value of current flowing through the DC/DC converter increases. Assuming that thereafter, while the value of current flowing through the DC/DC converter continues to exceed the current limit value I0 for a certain period of time, thereafter, the value of current flowing through the DC/DC converter lowers slightly below the current limit value I0 at a time th. When this state continues by the duration of time T1(ms) without any change, the current limiter of the DC/DC converter is restored to operate its normal limiter control at a time ti which is a time resulting when the time T1 has elapsed since the time th.

Incidentally, when the voltage of the lithium ion battery which has continued to be charged sine the time ta reaches a control termination voltage V5 at a time tH which is after the time th but before the time ti, the current limiter of the DC/DC converter is restored to operate its normal limiter control at the time tH, and the current limit value I0 is set. Thereafter, the value of current flowing through the DC/DC converter lowers below the current limit value I0, and the voltage of the lithium ion battery comes to reach the normal target voltage V4 at a time t1.

FIG. 7 shows a flowchart which shows a control procedure of the current limiter of the DC/DC converter in a case where current flowing through the DC/DC converter varies as shown in FIG. 6 while the lithium ion battery is charged. Also in this embodiment, the charging of the lithium ion battery is carried out while the vehicle is in the idling state or in the steady speed running state.

In step 701, the value of current LiA which flows into the lithium ion battery, an actual voltage value LiV of the lithium ion battery and the target charge voltage TLiV of the lithium ion battery are read. In the following step 702, whether or not the current limit value of the current limiter of the DC/DC converter is 15(A) is determined, and if the current limit value is 15(A), proceed to step 703, whereas if not, proceed to step 707.

In step 703, whether or not the value of current LiA which flows into the lithium ion battery is smaller than 15(A) is determined, and if LiA<15(A), this routine ends. If Li≧-15 (A) (in reality, since the current limit value of the current limiter is 15(A), whether or not LiA=15(A) may be determined), however, proceed to step 704. In step 704, time T during which LiA=15(A) is counted.

In the following step 705, whether or not the time T counted in step 704 becomes equal to or longer than a predetermined period of time is determined, and if T<T0, this routine ends. If T≧T0, however, proceed to step 706. In step 706, the current limit value of 15(A) of the current limiter is released, and the counted value of the time T is cleared, the routine ending. As a result, the current limit value of the current limiter is released, current up to 50(A) comes to flow through the DC/DC converter. The procedure from step 703 to step 706 corresponds to the operation occurring from the time tb to the time tc or from the time tf to the time tg in the time chart shown in FIG. 6.

On the other hand, in step 707 to which the routine proceeds if the current limit value is determined not to be 15(A) in step 702, whether or not the value of current LiA which flows into the lithium ion battery is smaller than 15(A) is determined, and if LiA≧15(A), proceed to step 711. If LiA<15(A), however, proceed to step 708. In step 708, time T during which LiA<15(A) is counted.

In the following step 709, whether or not the time T counted in step 708 becomes equal to or longer than a predetermined period of time T1 is determined, and if T<T1, proceed to step 711, whereas if T≧T1, proceed to step 710. In step 710, the current limit value of 15(A) of the current limiter is set, and the counted value of the time T is cleared, this routine ending. As a result, only current up to 15(A) comes to be allowed to flow through the DC/DC converter. The procedure from step 707 to step 710 corresponds to the operation occurring from the time td to the time te in the time chart shown in FIG. 6.

On the other hand, in step 711 to which the routine proceeds if the value of current LiA which flows into the lithium ion battery is determined to be equal to or larger than 15(A) in step 707 or if the determination in step 709 results in T<T1, an actual voltage of the lithium ion battery becomes equal to or larger than the control termination voltage V5 is determined. If the determination in the relevant step determines that the actual voltage of the lithium ion battery becomes equal to or larger than the control termination voltage V5, proceed to step 712, where the current limit value of 15(A) is set on the current limiter, and the counted value of the time T is cleared, this routine ending.

Thus, if the actual voltage of the lithium ion battery is determined to become equal to or larger than the control termination voltage V5, even in such a state that the current limit value of the current limiter is released, the current limit of 15(A) is set without any delay. The procedure occurring in step 711 and step 712 corresponds to the operation occurring from the time th to the time ti in the time chart shown in FIG. 6.

In addition, if the actual voltage of the lithium ion battery is determined to be below the control termination voltage V5 in step 711, proceed to step 713. In step 713, whether or not the target charge voltage TLiV of the lithium ion battery has been changed from the target voltage maximum value V3 to the normal target voltage V4 is determined. Then, if the change is determined not to have occurred yet, this routine ends as it is. If the change is determined to have occurred, however, proceed to step 714, where the current limit value of 15(A) of the current limiter is set, and the counted value of the time T is cleared, the routine ending.

As has been described heretofore, in the fourth embodiment, the value of current which flows into the side of the lithium ion battery via the DC/DC converter while the charge control on the lithium ion battery is carried out is monitored, so that the current limit value of the current limiter of the DC/DC converter is controlled according the current value so monitored. Due to this, compared to the charging method of the related art, the charging accuracy is increased, and the lithium ion battery can be charged completely faster.

Here, the switching of the target charge voltages of the lithium ion battery that has been described in the second and third embodiments or a switching control of the output voltage of the DC/DC converter will be described in greater detail. This switching control corresponds to a control for increasing the value of output voltage of the DC/DC converter and a control for restoring the value of output voltage of the DC/DC converter to its initial value.

Figure 8A:
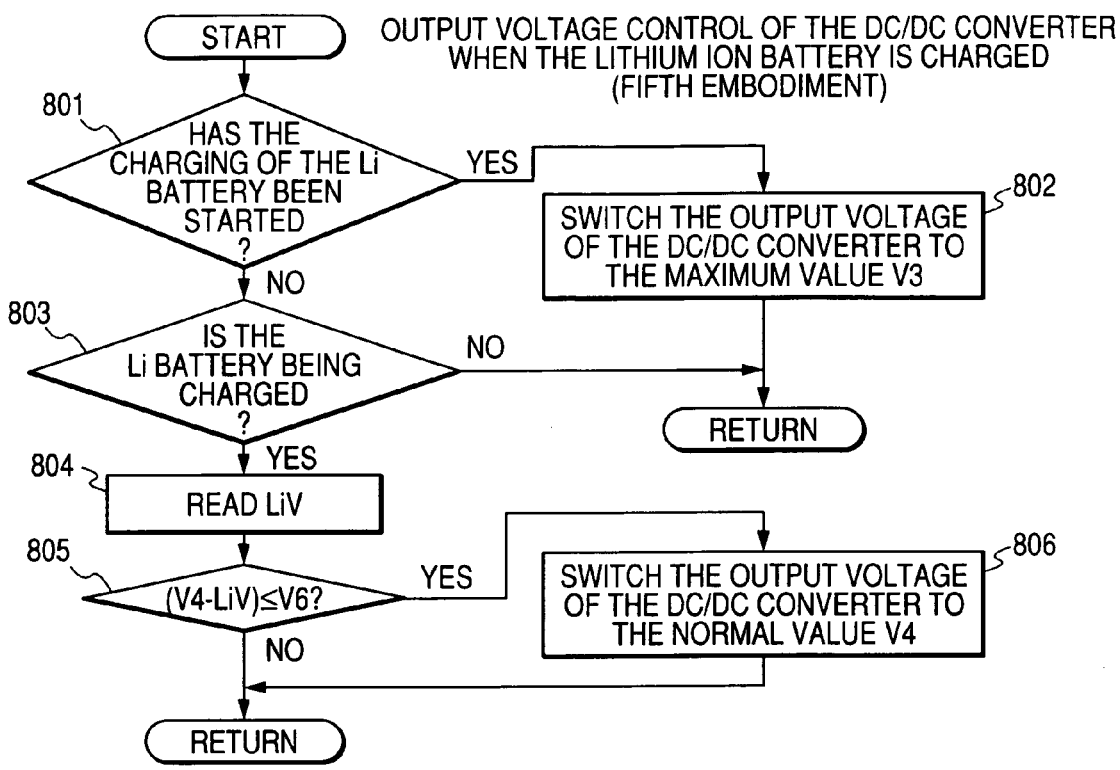
Figure 8B:
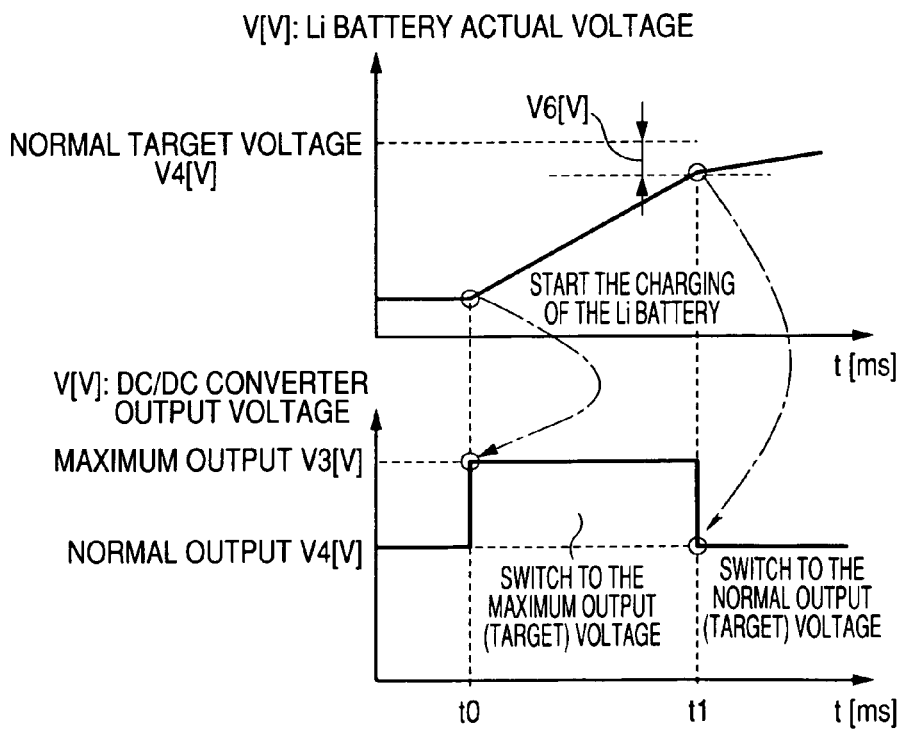

FIGS. 8(*a*), (*b*) are such as to shown a fifth embodiment of the invention and show specifically a first mode of a control procedure for the output voltage of the DC/DC converter when the lithium ion battery is charged. FIG. 8(*a*) is a flowchart which shows the control procedure for the output voltage of the DC/DC converter when the lithium ion battery is charged, and FIG. 8(*b*) is a time chart which shows transitions of the voltage value of the lithium ion battery and the output voltage of the DC/DC converter in the control shown in FIG. 8(*a*).

In step 801, whether or not the lithium ion battery has been started to be charged is determined. If the charging of the lithium ion batter has already been started, proceed to step 802, where the output voltage of the lithium ion battery is switched to the output voltage maximum value V3. If the charging of the lithium ion battery has not yet been started, or if the charging thereof has already been executed, proceed from step 801 to step 803, where whether or not the lithium battery is being charged is determined. Then, if the lithium ion battery is not being charged, the routine ends as it is, whereas if the lithium ion battery is being charged, proceed to step 804.

An actual voltage LiV of the lithium ion battery is read in step 04, and a comparison between the actual voltage LiV and the normal target voltage V4 of the lithium ion battery is carried out to determine whether or not a difference between the normal target voltage V4 and the actual voltage LiV of the lithium ion battery becomes smaller than a predetermined voltage V6 in step 805. The determination made in step 805 results in (V4−LiV)>V6, the routine ends as it is, whereas if (V4−LiV)≦V6, proceed to step 806, where the output voltage of the DC/DC converter is switched from the output voltage maximum value V3 to the normal output voltage value V4 and this routine ends.

Part of the procedure where the routine proceeds from step 801 to step 802 in FIG. 8(*a*) corresponds to a time t0 in FIG. 8(*b*), part of the procedure where the routine proceeds from step 804 to step 805 in FIG. 8(*a*) and the determination in step 805 results in NO corresponds to a waveform drawn from the time t0 to a time t1, and part of the procedure where the routine proceeds from step 805 to step 806 in FIG. 8(*a*) corresponds to the time t1 in FIG. 8(*b*).

Figure 9A:
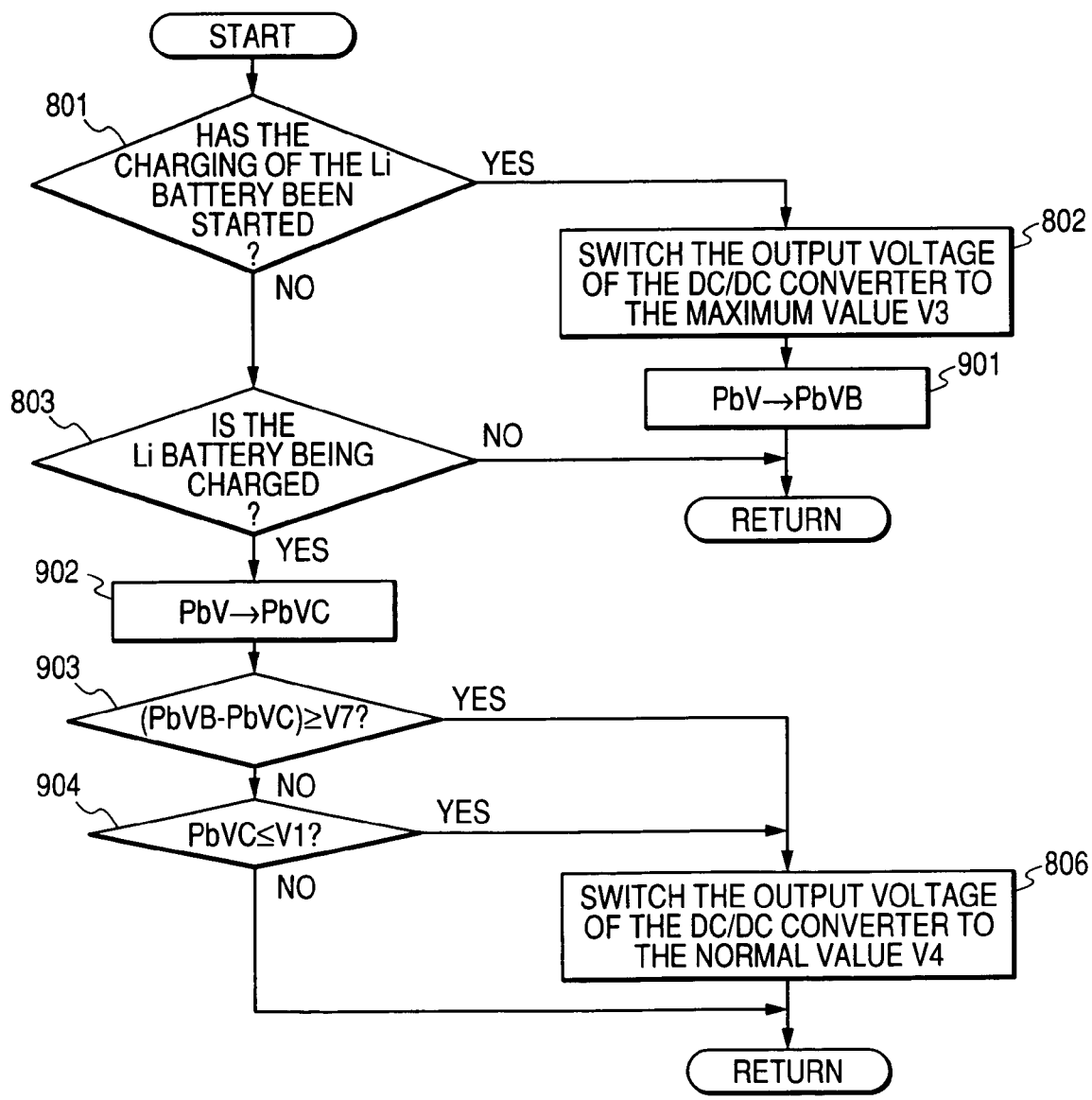

FIGS. 9(*a*) to (*c*) are such as to show a sixth embodiment of the invention and show specifically a second mode of a control procedure for the output voltage of the DC/DC converter when the lithium ion battery is charged. FIG. 9(*a*) is a flowchart which shows the control procedure for the output voltage of the DC/DC converter according to the voltage state of the lead battery when the lithium ion battery is charged, FIG. 9(*b*) is a time chart which shows a transition of the output voltage of the DC/DC converter when the voltage value of the lead battery is high in the control shown in FIG. 9(*a*), and FIG. 9(*c*) is a time chart which shows a transition of the output voltage of the DC/DC converter when the voltage value of the lead battery is low in the control shown in FIG. 9(a).

In the second mode of the control procedure for the output voltage of the DC/DC converter when the lithium ion battery is charged, like reference numerals will be imparted to like steps to those of the control procedure of the first mode for description thereof.

In step 801, whether or not the lithium ion battery has been started to be charged is determined. If the charging of the lithium ion battery has already been started, proceed to step 802, where the output voltage of the DC/DC converter is switched to the output voltage maximum value V3. Then, in step 901, a voltage value PbV of the lead battery which is resulting then is stored as a voltage value PbVB of the lead battery which results when the lithium ion battery is started to be charged, and this routing ends.

On the contrary, if the charging of the lithium ion battery has not yet been started, or if the charging thereof has already been executed, proceed from step 801 to 803, where whether or not the lithium ion battery is being charged is determined. Then, if the lithium ion battery is not being charged, the routine ends as it is, whereas if the lithium ion battery is being charged, proceed to step 902.

In step 902, an actual voltage PbV of the lead battery is read, and the value so read is stored as a current actual voltage PbVC of the lead battery. In the following step 903, a comparison is carried out between the voltage value PbVB of the lead battery which resulted when the charging of the lithium ion battery was stared and the current voltage value PbVC of the lead battery to determined whether or not a difference between the voltage value PbVB of the lead battery which resulted when the charging of the lithium ion battery was stared and the current voltage value PbVC of the lead battery becomes larger than a predetermined voltage V7.

If the determination made in step 903 results in (PbVB−PbVC)≧V7, proceed to step 806, where the output voltage of the DC/DC converter is switched from the output voltage maximum value V3 to the normal output value V4, and this routine ends. On the contrary, if the determination made in step 903 results in (PbVB−PbVC)<V7, proceed to step 904, where whether or not the current actual voltage PbVC of the lead battery is equal to or smaller than the charge control permissive voltage V1 for the lead battery is determined. If the determination made in step 904 results in PbVC≦V1, proceed to step 806, where the output voltage of the DC/DC converter is switched from the output voltage maximum value V3 to the normal output voltage value V4, and this routine ends. On the contrary, if the determination made in step 904 results in PbVC>V1, the routine ends as it is.

Figure 9B:
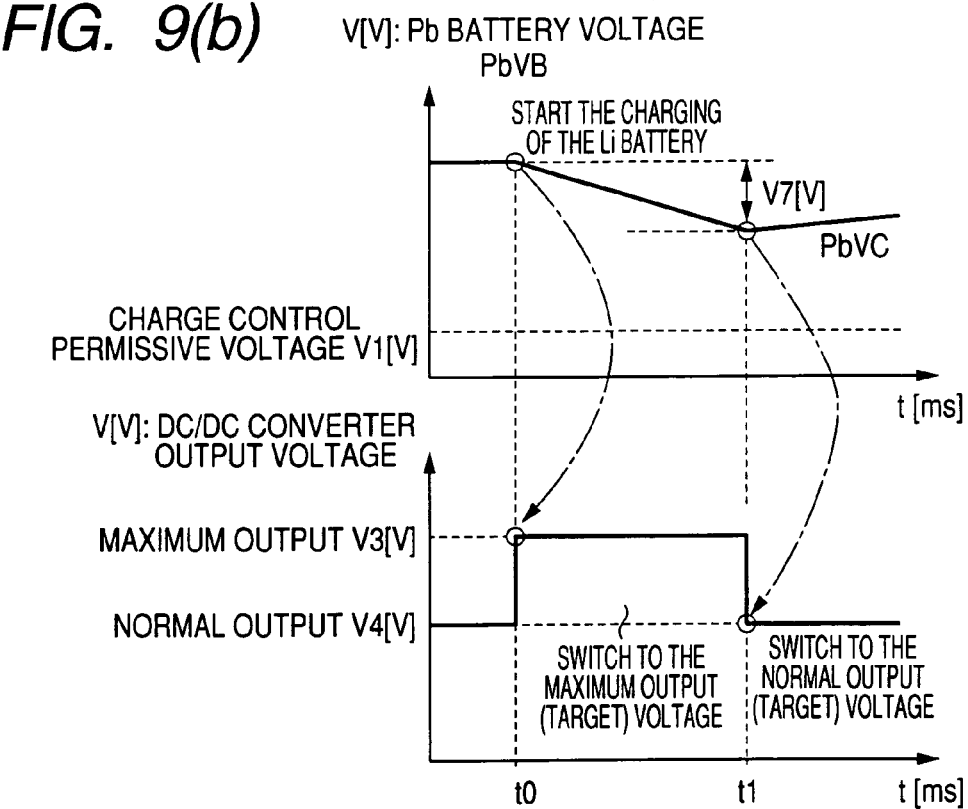

Part of the procedure where the routine proceeds from step 801 to step 802 in FIG. 8(a) corresponds to a time t0 in each of FIGS. 9(b), (c). On the other hand, part of the procedure where the routine proceeds from step 903 to step 806 in FIG. 9(a) corresponds to a time t1 in FIG. 9(b), and part of the procedure where the routine proceeds from step 903 to step 904 and then to step 806 in FIG. 9(a) corresponds to a time t1 in FIG. 9(c).

Figure 9C:
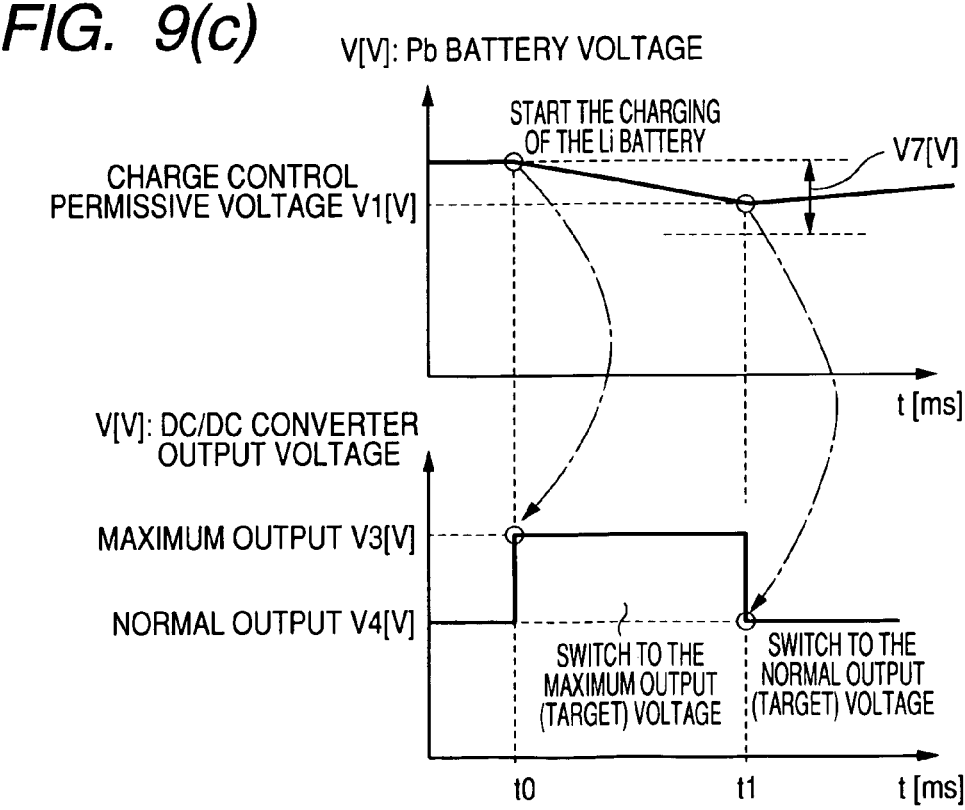

As shown in FIG. 9(b), when the voltage value of the lead battery is high, the output voltage of the DC/DC converter may be switched to the normal output voltage value V4 at a point in time where the voltage value of the lead battery lowers by the predetermined voltage value V7. As shown in FIG. 9(c), however, when the voltage value of the lead battery is low, the voltage value of the lead battery lowers below the charge control permissive voltage V1 before the voltage value of the lead battery lowers by the predetermined voltage value V7. Consequently, in this case, the output voltage of the DC/DC converter needs to be switched to the normal output voltage value V4 at a point in time where the voltage value of the lead battery lowers below the charge control permissive voltage V1.

Figure 10A:
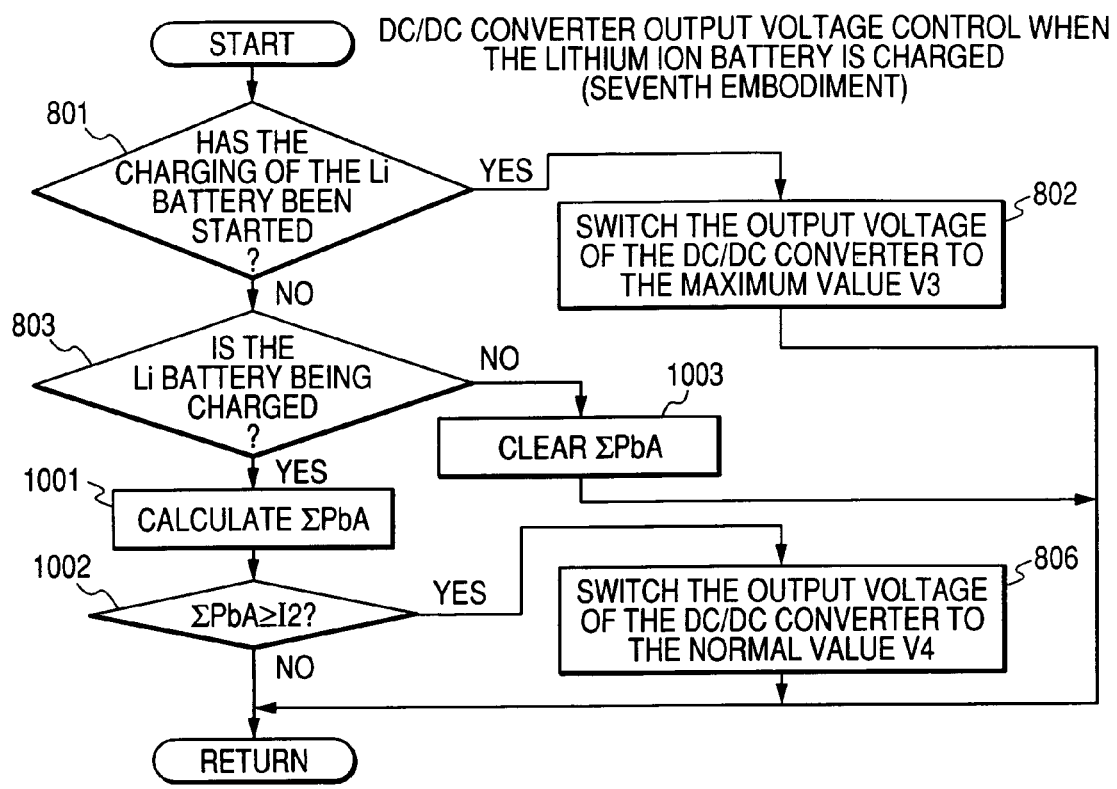
Figure 10B:
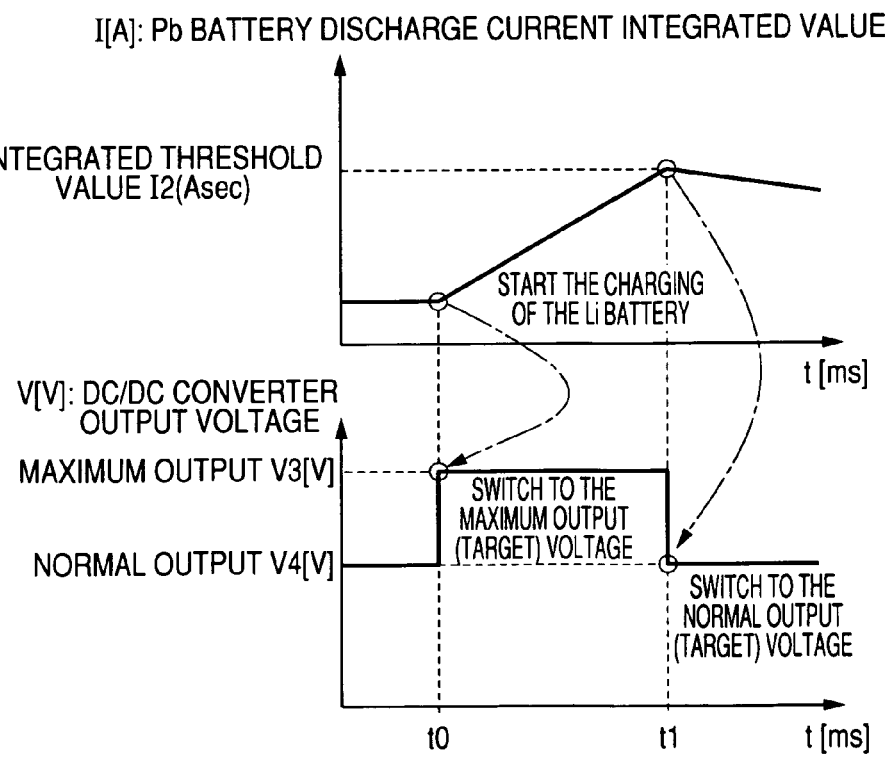

FIGS. 10(a), (b) are such as to show a seventh embodiment of the invention and show specifically a third mode of a control procedure for the output voltage of the DC/DC converter when the lithium ion battery is charged. FIG. 10(a) is a flowchart which shows the control procedure for the output voltage of the DC/DC converter according to an integrated value of discharge current of the lead battery when the lithium ion battery is charged, and FIG. 10(b) is a time chart which shows a transition of the integrated value of the discharge current discharged from the lead battery in the control shown in FIG. 10(a).

In the third mode of the control procedure for the output voltage of the DC/DC converter when the lithium ion battery is charged, like reference numerals will be imparted to like steps to those of the control procedure of the first mode for description thereof.

In step 801, whether or not the lithium ion battery has been started to be charged is determined. If the charging of the lithium ion battery has already been started, proceed to step 802, where the output voltage of the DC/DC converter is switched to the output-voltage maximum value V3, and this routine ends.

On the contrary, if the charging of the lithium ion battery has not yet been started, or if the charging thereof has already been executed, proceed from step 801 to step 803, where whether or not the lithium ion battery is being charged is determined. Then, if the lithium ion battery is not being charged, an integrated value ΣPbA of discharge current of the lead battery is cleared in step 1003, and this routine ends, whereas if the lithium ion battery is being charged, proceed to step 1001.

In step 1001, an integrated value ΣPbA of discharge current of the lead battery is calculated. The integrated value ΣPbA of discharge current of the lead battery is a value which indicates an amount of power that has been discharged from the lead battery since the charging of the lithium ion battery was started. In the following step 1002, whether or not the integrated value ΣPbA of discharge current of the lead battery becomes equal to or larger than a predetermined threshold value I2 is determined.

If the determination made in step 1002 results in ΣPbA>=I2, proceed to step 806, where the output voltage of the DC/DC converter is switched from the output voltage maximum value V3 to the normal output voltage value V4, and this routine ends. On the contrary, if the determination made in step 1002 results in ΣPbA<I2, this routine ends.

Part of the procedure where the routine proceeds from step 801 to step 802 in FIG. 10(a) corresponds to a time t0 in FIG. 10(b). On the other hand, part of the procedure where the routine proceeds from step 1002 to step 806 in FIG. 10(a) corresponds to a time t1 in FIG. 10(b). In this embodiment, in the event that the discharge amount from the lead battery becomes large while the lithium ion battery is being charged, the charging of the lithium ion battery is suppressed so as to suppress the discharge from the lead battery, so that the deterioration of the lead battery is prevented.

FIG. 11 is such as to show an eighth embodiment of the invention and show specifically a fourth mode of a control procedure for the output voltage of the DC/DC converter when the lithium ion battery is charged. This embodiment is an embodiment which results by combining together the sixth embodiment and the seventh embodiment, which have been described before, and which is configured such that the output voltage maximum value V3 of the DC/DC converter is not switched to the normal output voltage value V4 thereof as long as a voltage drop in the actual voltage PbV of the lead battery does not reach or exceed V7 and the integrated value ΣPbA of the discharge current of the lead battery does not reach or exceed I2 after the charging of the lithium ion battery is started a time t0.

In the eighth embodiment shown in FIG. 11, the integrated value ΣPbA of the discharge current of the lead battery comes to reach or exceed I2 at a time t1 after the charging of the lithium ion battery was started at a time t0, and the voltage drop in the actual voltage PbV of the lead battery comes to reach or exceed V7 thereafter at a time t2, whereupon the output voltage maximum value V3 of the DC/DC converter is switched to the normal output voltage value V4. However, in the event that the voltage drop in the actual voltage PbV of the lead battery reaches or exceeds V7 earlier at the time t1, unless the integrated value ΣPbA of the discharge current of the lead battery comes to reach or exceed I2 thereafter at the time t2, the output voltage maximum value V3 of the DC/DC converter is not switched to the normal output voltage value V4.

The flowchart described with respect to the sixth embodiment and the flow chart described with respect to the seventh embodiment may only have to be combined together to describe a flowchart which shows the control procedure of the eighth embodiment, and hence, in the eighth embodiment, the illustration and description of the relevant flowchart will be omitted.

FIG. 12 is such as to show a ninth embodiment of the invention in which the control procedure of the output voltage of the DC/DC converter when the lithium ion battery is being charged is combined with the control of the current limit value of the current limiter incorporated in the DC/DC converter. In the ninth embodiment, only a flowchart is shown which shows a control procedure. The ninth embodiment is such that in the event that the output voltage of the DC/DC converter is lowered from the output voltage maximum value V3 to the normal output voltage value V4 while the lithium ion battery is being charged, at the same time as this occurs, the current limit value of the current limiter incorporated in the DC/DC converter is set to 15(A). The current limit value is such that only one value is set therefor.

In step 1201, the output voltage of the DC/DC converter is read and stored, and in step 1202, whether or not the previous output voltage of the DC/DC converter was the output voltage maximum value V3 is determined. If the previous output voltage of the DC/DC converter was not the output voltage maximum value V3, the routine ends as it is, whereas if the previous output voltage of the DC/DC converter was the output voltage maximum value V3, proceed to step 1203.

In step 1203, whether or not a current output voltage of the DC/DC converter is the normal output voltage value V4 is determined, and if the current output voltage of the DC/DC converter is not the normal output voltage value V4, the routing ends as it is. On the contrary, if the determination made in step 1203 determines that the current output voltage of the DC/DC converter is the normal output voltage value V4, proceed to step 1204 while determining that the output voltage of the DC/DC converter has been lowered from the output voltage maximum value V3 to the normal output voltage value V4. In step 1204, the current limit value of the current limiter incorporated in the DC/DC converter is set to 15(A), and this routine ends.

Figure 13:
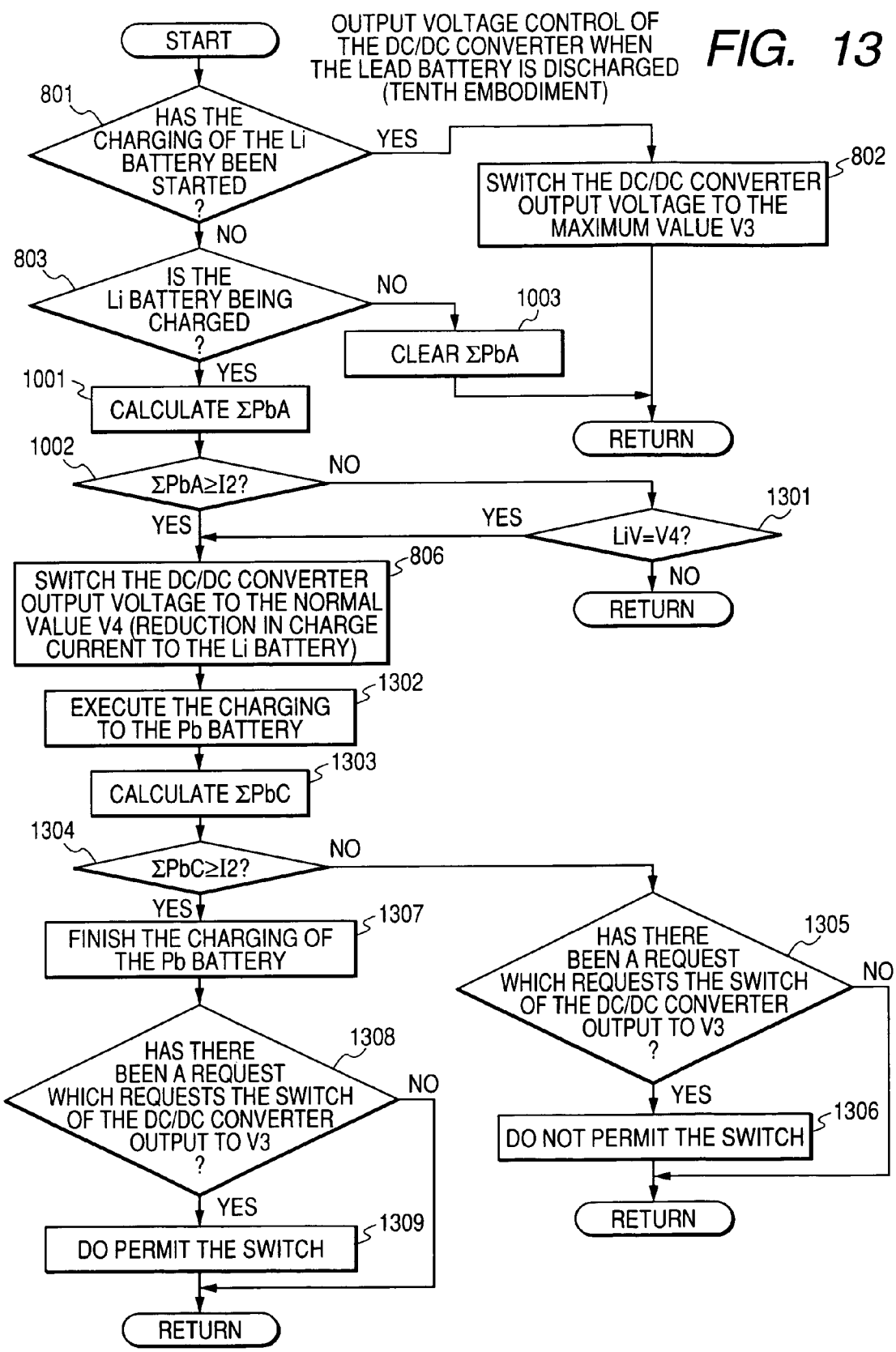
FIG. 13 is a flowchart of a tenth embodiment of the invention which shows an embodiment of an output voltage control of the DC/DC converter when a lead battery is discharged.
Figure 14:
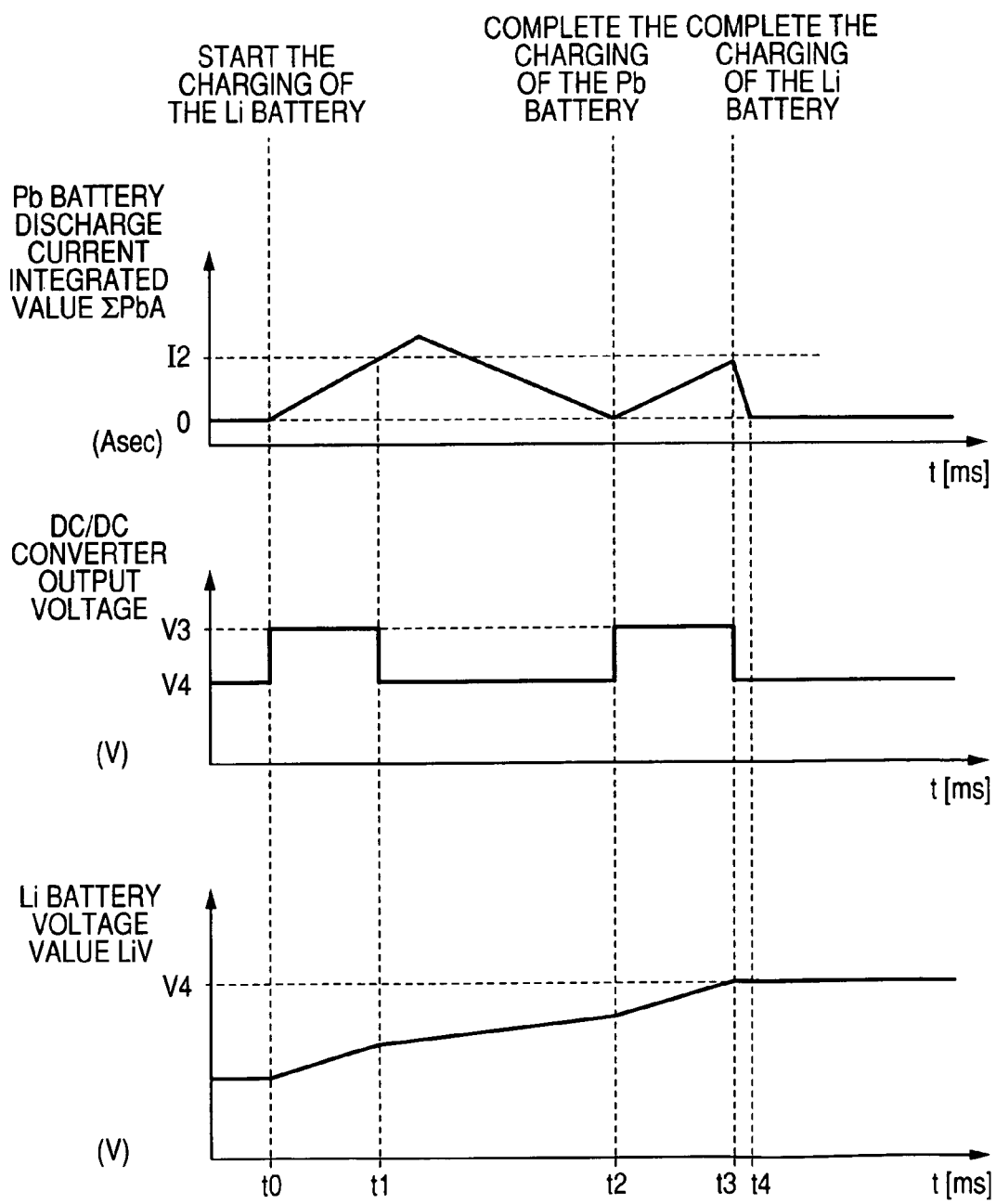
FIG. 14 is a time chart of the tenth embodiment of the invention which shows transitions of an integrated value of discharge current from the lead battery, the output voltage of the DC/DC converter and the voltage value of the lithium ion battery in the control procedure shown in FIG. 13.

FIGS. 13 and 14 are such as to show a tenth embodiment of the invention, which shows specifically a fifth mode of a control procedure of the output voltage of the DC/DC converter when the lithium ion battery is charged. FIG. 13 is a flowchart which shows the control procedure for the output voltage of the DC/DC converter according to an integrated value of discharge current of the lead battery when the lithium ion battery is charged and FIG. 14 is a time chart which shows transitions of an integrated value of discharge current discharged from the lead battery, the output voltage of the DC/DC converter and the output voltage value of the lithium ion battery in the control shown in FIG. 13.

Note that in the fifth mode of the control procedure for the output voltage of the DC/DC converter when the lithium ion battery is charged, like reference numerals will be imparted to like steps to those of the third embodiment for description.

In step 801, whether or not the charging of the lithium ion battery has already been started is determined. If the charging of the lithium ion battery has already been started, proceed to step 802, where the output voltage of the DC/DC converter is switched to the output voltage maximum value V3, and this routine ends.

On the contrary, if the charging of the lithium ion battery has not yet been started, or when the charging thereof has been executed, proceed from step 801 to step 803, where whether or not the lithium ion battery is being charged is determined. Then, if the lithium ion battery is not being charged, in step 1003, an integrated value ΣPbA of discharge current of the lead battery is cleared, and this routine ends, whereas if the lithium ion battery is being charged, proceed to step 1001.

In step 1001, an integrated value ΣPbA of discharge current of the lead battery is calculated. In the following step 1002, whether or not the integrated value ΣPbA of discharge current of the lead battery has reached or exceeded a predetermined threshold value I2 is determined. If the determination made in step 1002 results in ΣPbA≧I2, proceed to step 806, where the output voltage of the DC/DC converter is switched from the output voltage maximum value V3 to the normal output voltage value V4, and then the routine proceeds to step 1302. On the contrary, if the determination made in step 1002 results in ΣPbA<I2, proceed to step 1301.

The step 1301 is such as to determine whether or not the charging of the lithium ion battery has been completed, and whether or not the voltage LiV of the lithium ion battery has become the normal output voltage V4 is determined. Then, if LiV=V4, proceed to step 806, where the output voltage of the DC/DC converter is switched from the output voltage maximum value V3 to the normal output voltage value V4, but if otherwise, this routine ends.

When the output voltage of the DC/DC converter is switched from the output voltage maximum value V3 to the normal output voltage value V4 in step 806, charge current to the lithium ion battery is reduced, and a value of current that is so reduced can be allocated to the charging of the lead battery. Then, in this embodiment, in step 1302, the charging of the lead battery is carried out, and in step 1303, an integrated value ΣPbC of charge current to the lead battery is calculated.

Then, in step 1304, it is determined whether or not the integrated value ΣPbC of charge current to the lead battery has reached I2 which is the integrated value of the discharge current PbA from the lead battery. If the integrated value ΣPbC of charge current to the lead battery has not reached I2, proceed to step 1305, where it is determined whether or not a switching request has been made which requests the switching of the normal output voltage value V4 of the DC/DC converter to the output voltage maximum value V3 thereof. Then, if there has been made no request which requests the switching of the normal output voltage value V4 of the DC/DC converter to the output voltage maximum value V3 thereof, the routine ends as it is, whereas even if there has been made a request which requests the switching of the normal output voltage value V4 of the DC/DC converter to the output voltage maximum value V3 thereof, in step 1306, the requested switching is made impermissible, and the routine ends. Namely, in this embodiment, in the event that the integrated value ΣPbC of charge current to the lead battery has not yet reached I2, the switching of the output voltage of the DC/DC converter from the normal output voltage value V4 to the output voltage maximum value V3 is not permitted.

On the contrary, in the event that the integrated value ΣPbC of charge current to the lead battery has reached I2 in step 1304, proceed to step 1307, and the charging of the lead battery is completed. In this case, in step 1308, it is determined whether or not there has been made a request which requests the switching of the normal output voltage value V4 of the DC/DC converter to the output voltage maximum value V3 thereof, and if there has been made no request which requests the switching of the normal output voltage value V4 of the DC/DC converter to the output voltage maximum value V3 thereof, the routine ends as it is, whereas if there has been made a request which requests the switching of the normal output voltage value V4 of the DC/DC converter to the output voltage maximum value V3 thereof, the switching is then made permissible in step 1309, and this routine ends. Namely, in this embodiment, in the event that the integrated value ΣPbC of charge current to the lead battery has reached I2, the switching of the normal output voltage value V4 of the DC/DC converter to the output voltage maximum value V3 thereof is permitted.

Part of the procedure where the routine proceeds from step 801 to step 802 in FIG. 13 corresponds to a time t0 in FIG. 14. In addition, part of the procedure where the routine proceed from step 1002 to step 806 in FIG. 13 corresponds to a time t1 in FIG. 14. Furthermore, part of the procedure where the routine proceeds from step 1304 to step 1309 in FIG. 13 corresponds to a time t2 in FIG. 14. In addition, part of the procedure where the routine proceeds from step 1301 to step 806 in FIG. 13 corresponds to a time t3 in FIG. 14. When the charging of the lithium ion battery is completed at the time t3, the lead battery is charged quickly, and the charging of the lead battery is completed at a time t4.

In the fifth to tenth embodiments that have been described heretofore, the control is executed in which the output voltages of the DC/DC converter are switched on a timing when the lithium ion battery has been charged to some extent relative to the target charge voltage value, so that the actual voltage of the lithium ion battery is made to converge on the target voltage, whereby not only the lithium ion battery can be charged faster but also the actual voltage of the lithium ion battery can be made to converge on the target voltage in an ensured fashion. In addition, whether or not the charge control is to be executed is not determined by the voltage value of the lithium ion battery, but the state of the lead battery is monitored, and in the event that there occurs a discharge from the lead battery, resulting in the generation of a remarkable voltage reduction on the lead battery side, the charge control made on the lithium ion battery side according to the invention is interrupted, so that the normal charge control is carried out on the lithium ion battery, whereby the deterioration of the lead battery can also be prevented.

In addition, although there occurs no remarkable voltage reduction in the lead battery while the lithium ion battery is being charged, in the event that the voltage value of the lead battery lowers down to the charge control permissive voltage V1, since the charge control of the invention is interrupted so as to carry out the normal charge control on the lithium ion battery, the reduction in the voltage of the lead battery to the economical running prohibiting region can be prevented. Furthermore, in the event that a portion of power that was discharged from the lead battery while the charge control of the invention was being executed can be charged back to the lead battery by monitoring the discharge current from the lead battery after the charge control has been shifted from the charge control according to the invention to the normal lithium ion battery charge control, the charge control is restored again from the normal charge control to the charge control according to the invention, thereby making it possible to contribute to the quick charging of the lithium ion battery.

Figure 15:
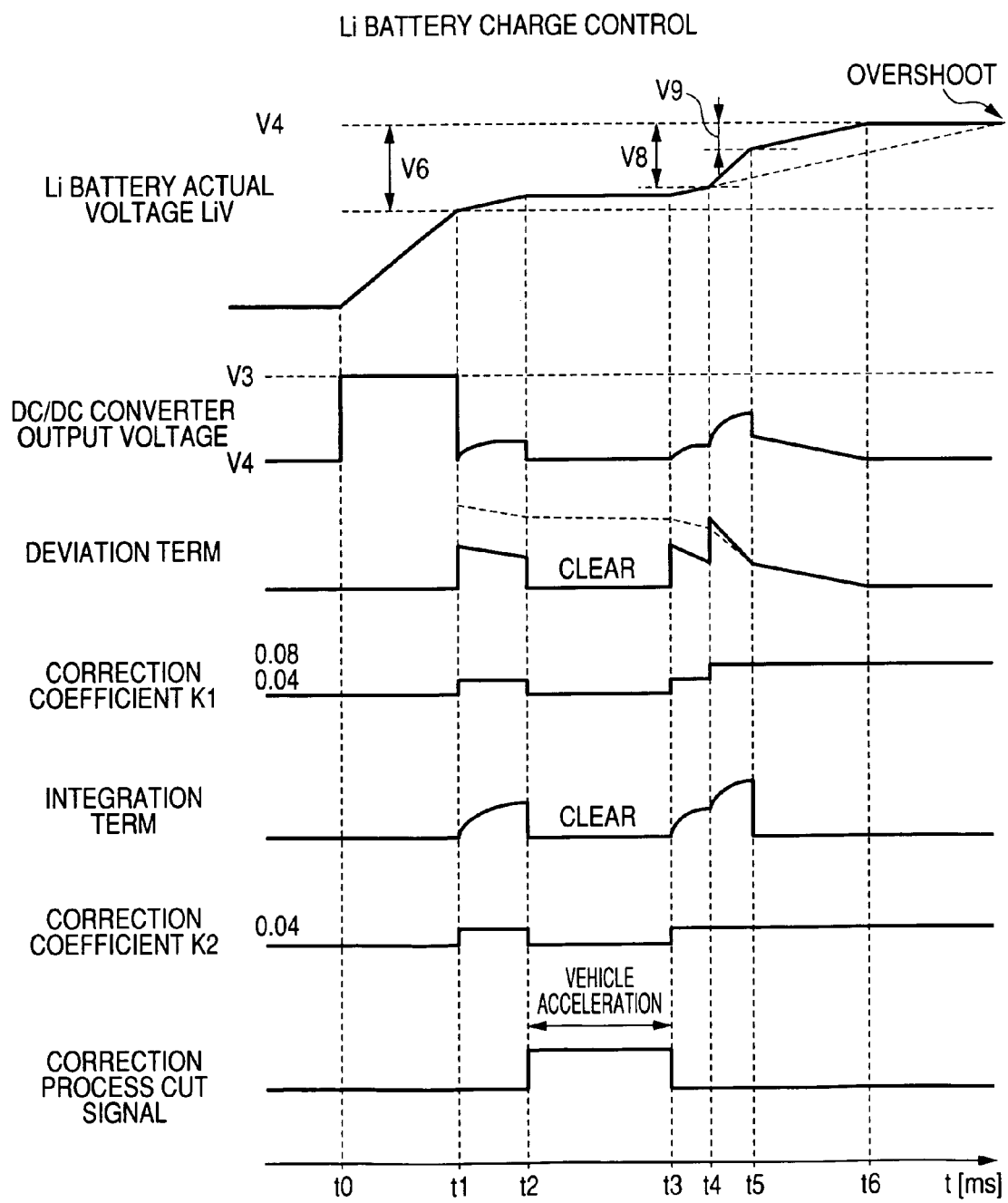
FIG. 15 is a time chart of an eleventh embodiment of the invention which explains a correction process in a charge control of the lithium ion battery.

FIG. 15 is such as to show an eleventh embodiment of the invention and is a time chart which explains a correction process in the charge control of the lithium ion battery. FIG. 15 shows a transition of the actual voltage LiV of the lithium ion battery, a transition of the output voltage of the DC/DC converter, a transition of a deviation term (a broken line) between the normal output voltage value V4 of the target charge voltage value TiLV of the lithium ion battery and the actual voltage LiV of the lithium ion battery and a transition of a value (a solid line) resulting from multiplying the deviation term by a correction coefficient K1, a transition of the correction coefficient K1, a transition of an integration term of deviation, a transition of a correction coefficient K2 and a transition of a correction processing cut signal.

When the charging of the lithium ion battery is started at a time t0, the actual voltage LiV of the lithium ion battery increases gradually. Since a differential voltage between the actual voltage LiV and the normal target voltage V4 of the lithium ion battery becomes V6 at a time t1, the charge control is shifted to a control where the actual voltage LiV of the lithium ion battery is made to converge on the target voltage. This control is such that the lithium ion battery is charged so that the actual voltage LiV thereof increases to a certain voltage quickly, and when the lithium ion battery is charged to the vicinity of the target voltage, this control is shifted to another charge control.

Consequently, the output of the DC/DC converter is switched to the normal target voltage V4 at a time t1, and the deviation term and the integration term are used so as to start an output voltage correction process of the DC/DC converter. At the time t1, both the value of the correction coefficient K1 and the value of the correction coefficient K2 become a predetermined set value, for example, 0.04. Due to this, the output voltage of the DC/DC converter continues to increase slightly until a time t2. The correction coefficient K1 is a coefficient by which the deviation term is multiplied, and the coefficient K2 is a coefficient by which the integration term is multiplied. The deviation term which is multiplied by the correction coefficient K1 and the integration term which is multiplied by the correction coefficient K2 are added to the actual voltage of the lithium ion battery.

Here, consider a state in which the vehicle is accelerated from a time t2 to a time t3. Charging to the lithium ion battery is cut in such a state that the vehicle is accelerated. In this case, in this embodiment, the correction process cut signal is made to be on, and no correction process is executed. In addition, the deviation term and the integration term are cleared so as to be ready for the following correction process.

When the correction process cut signal is made to be off at a time t3, the correction process is resumed, and both the value of the correction coefficient K1 and the correction coefficient K2 becomes the predetermined set value, for example, 0.04. As a result, the charging to the lithium ion battery is resumed, and the actual voltage LiV of the lithium ion battery increases slightly. Then, in the event that the differential voltage between the actual voltage LiV and the target voltage V4 of the lithium ion battery becomes equal to or smaller than V8 at a time t4, the value of the correction coefficient K1 is switched to increase, and the value becomes another correction value, for example, 0.08. This is because in the event that the deviation term is not increased here, it will take a long period of time for the actual voltage LiV of the lithium ion battery to converge on the target voltage V4 thereof and because the actual voltage LiV of the lithium ion battery is caused to converge on the target voltage V4 of the lithium ion battery even in the event that the deviation term becomes minute. A transition of the actual voltage LiV of the lithium ion battery is indicated by a broken line which results in the event that the deviation coefficients are not switched over at a time t4 and the integration term is not cleared at a time t5. In this case, the actual voltage LiV of the lithium ion battery overshoots relative to the target voltage V4 of the lithium ion battery at a certain time after a time t6.

In the event that a differential voltage between the actual voltage LiV and the target voltage V4 of the lithium ion battery becomes equal to or smaller than V9 thereafter at a time t5, the integration term is cleared, and the correction process is carried out by the deviation term only. In the event that the charge control of the invention is carried out over a long period of time, the integration term is increased, and as a result, the output voltage of the DC/DC converter after correction is corrected to the vicinity of the maximum output value, this resulting in the generation of an overshoot in which the actual voltage LiV of the lithium ion battery becomes higher than the target voltage V4 thereof. In order to prevent the generation of this overshoot, when the actual voltage LiV of the lithium ion battery converges on the vicinity of the target voltage V4 thereof [equal to or larger than (V4-V9)], the integration term is cleared, and the convergence control is carried out by the deviation term only in which the actual voltage LiV of the lithium ion battery is made to converge on the target voltage V4 thereof.

By the control that has been described heretofore, the correction process of the output voltage control of the DC/DC converter is executed on the timing when the actual voltage LiV of the lithium ion battery is charged to the certain voltage, and due to the deviation between the actual voltage LiV and the normal target voltage V4 of the lithium ion battery, by operating the deviation term and the integration term, the accurate and quick charging of the lithium ion battery and the convergence of the actual voltage LiV on the normal target voltage V4 of the lithium ion battery can be ensured. In addition, even in the event that the deviation term becomes minute, the actual voltage LiV of the lithium ion battery can be made to converge on the normal target voltage V4 of the lithium ion battery.

Furthermore, when the actual voltage LiV of the lithium ion battery converges on the vicinity of the normal target voltage V4 of the lithium ion battery, the integration term is cleared, and the correction process is executed by the deviation term only, whereby the likelihood that the actual voltage LiV of the lithium ion battery overshoots the normal target voltage V4 is reduced.

Figure 16:
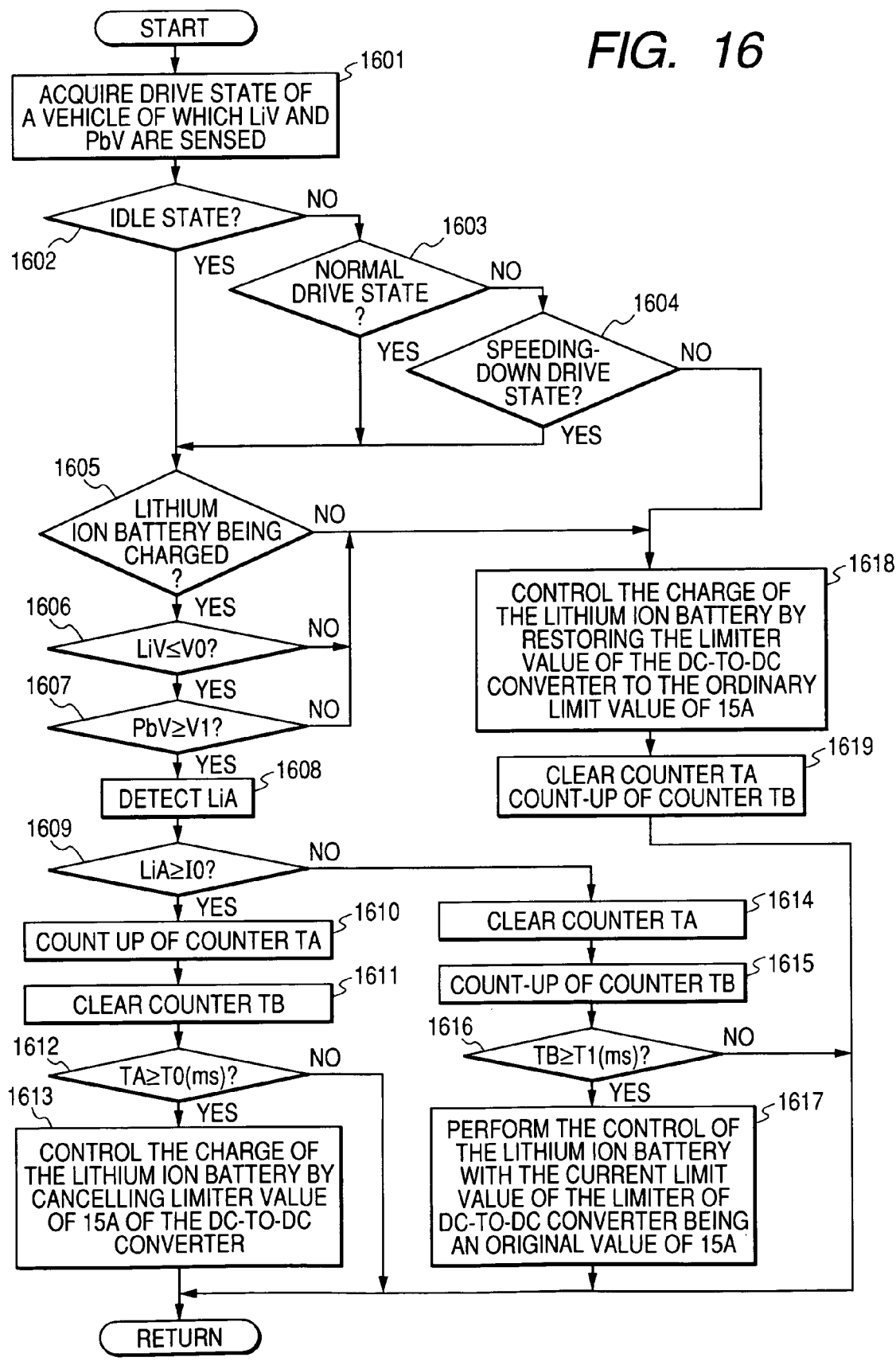
FIG. 16 is a flowchart diagram illustrating an operation of controlling the cancellation of a limiter value in the process of controlling the charge of the lithium ion battery according to a twelfth example embodiment of the present invention.

FIG. 16 is a flowchart diagram illustrating an operation of controlling the cancellation of a limiter value in the process of controlling the charge of the lithium ion battery according to a twelfth example embodiment of the present invention. According to the twelfth example embodiment, the operation is performed as follows:

(1) the operation of controlling the early charge of the lithium ion battery is performed only in the case of the voltage of the lithium ion battery being lower and the voltage of the lead battery being higher.

(2) The charge of the lead battery has a priority higher than the charge of the lithium ion battery, and when the voltage of the lead battery is low, the operation of controlling the early charge of the lithium ion battery is not performed.

(3) When the time period during which the current value flowing through the DC/DC converter is above 15 A, which is an ordinary limiter value, is longer than a predetermined time period, the limiter value is cancelled so that the limiter value is increased to 50 A.

The limiter value is not cancelled at the beginning because, in order to cancel the limiter value, the current may not flow from economical running ECU10 to the DC/DC converter 3. Namely, a high level signal must be provided to the terminal DDRE of the DC/DC converter 3, which will result in unwanted power consumption. In the above twelfth example embodiment, the limiter value is cancelled on the exact timing by detecting the condition which requires that the limiter value to be cancelled, so that the power consumption may be reduced and the lithium ion battery may be charged at an early stage. An example embodiment of this process will be described with reference to FIG. 16.

In step 1601, the voltage LiV of the lithium ion battery, the voltage PbV of the lead battery and the motion of a vehicle are sensed. Next, in step 1602 through step 1604, a drive state of the vehicle is determined. First, in step 1602, whether the vehicle is in an idle state or not is determined. When the vehicle is in the idle state, step 1605 is performed. Otherwise, whether the vehicle is in a normal drive state or not is determined in step 1603. When the vehicle is in the normal drive state, step 1605 is performed. Otherwise, whether the vehicle is in a speeding-down drive state or not is determined in step 1604. If the vehicle is in the speeding-down drive state, step 1605 is performed. Otherwise, step 1618 is performed.

As mentioned above, step 1605 is performed when the vehicle is determined to be in one of the idle state, normal drive state and the speeding-down drive state to determine whether the lithium ion battery is being charge. Here, a signal is inputted to the terminal DDDR of the DC/DC converter of FIG. 1 so that a current flows through the lithium ion battery. When the lithium ion battery is being charged, a step 1606 is performed. In step 1606, whether a voltage of the lithium ion battery LiV is less than or equal to the voltage V0 is determined. If the voltage LiV is less than or equal to the voltage V0, a step 1607 is performed. In step 1607, whether a voltage PbV of the lead battery is greater than or equal to the voltage V1 is determined.

If all the answers to the step 1605 through step 1607 are "Yes", step 1608 is performed so that the current LiA charged in the lithium ion battery is sensed by a sensor 2A illustrated in FIG. 1. If any one of the answers to step 1605 through step 1607 is "No", step 1618 is performed. When the current LiA of the lithium ion battery is sensed in step 1608, whether the current LiA of the lithium ion battery is greater than or equal to a reference current I0 is determined in step 1609. If the current LiA of the lithium ion battery is greater than or equal to the reference current I0, step 1610 is performed. Otherwise, step 1614 is performed.

In step 1610, a count value of a counter TA that counts the time period during which the current LiA of the lithium ion battery is greater than or equal to the reference current I0 is increased. In step 1611, a count value of a counter TB that counts the time period during which the current LiA of the lithium ion battery is smaller than the reference current I0 is cleared. If the current LiA of the lithium ion battery is greater than or equal to a reference current I0, it is determined in step 1612 whether the time period TA during which the current LiA of the lithium ion battery is greater than or equal to a reference current I0 is longer than or equal to a predetermined time period T0. If the time period TA is shorter than the predetermined time period T0, the procedure is terminated. If the time period TA is longer than or equal to the predetermined time period T0, step 1613 is performed. In step 1613, the limit value for the current through the limiter installed in the DC/DC converter is cancelled, the procedure is terminated and the control operation of the charge of the lithium ion battery is performed. Accordingly, the limiter value in the DC/DC converter in FIG. 1 is increased from a general current limit value of 15 A to 50 A so that the control operation of the charge of the lithium ion battery is performed.

When the current LiA of the lithium ion battery is lower than the reference current I0, step 1614 is performed so that the count value of the counter TA is cleared. Next, in step 1615, the count value of the counter TB is increased. In the next step 1616, it is determined whether the time period TB during which the current LiA of the lithium ion battery is less than the reference current I0 is longer than or equal to a predetermined time period T1. If the time period TB is shorter than the predetermined time period T1, the procedure is terminated. If the time period TB is longer than or equal to the predetermined time period T1, step 1617 is performed. In step 1617, the limit value for the current through the limiter installed in the DC/DC converter is restored to the ordinary limit value of 15 A so that the control operation of the charge of the lithium ion battery is performed.

In addition, similar to step 1617, in step 1618 following after one of steps 1604, 1605, 1606 and 1607, the limit value for the current through the limiter of the DC/DC converter is restored to the ordinary limit value of 15 A so that the control operation of the charge of the lithium ion battery is performed. In this case, the count value of the counter TA and counter TB is cleared and terminate the procedure. Based on the control operation described above, with respect to various drive state of a vehicle, the control of the quick charge of the lithium ion battery may be performed when the voltage of the lithium ion battery is lower and the voltage of the lead battery is higher.

Figure 17:
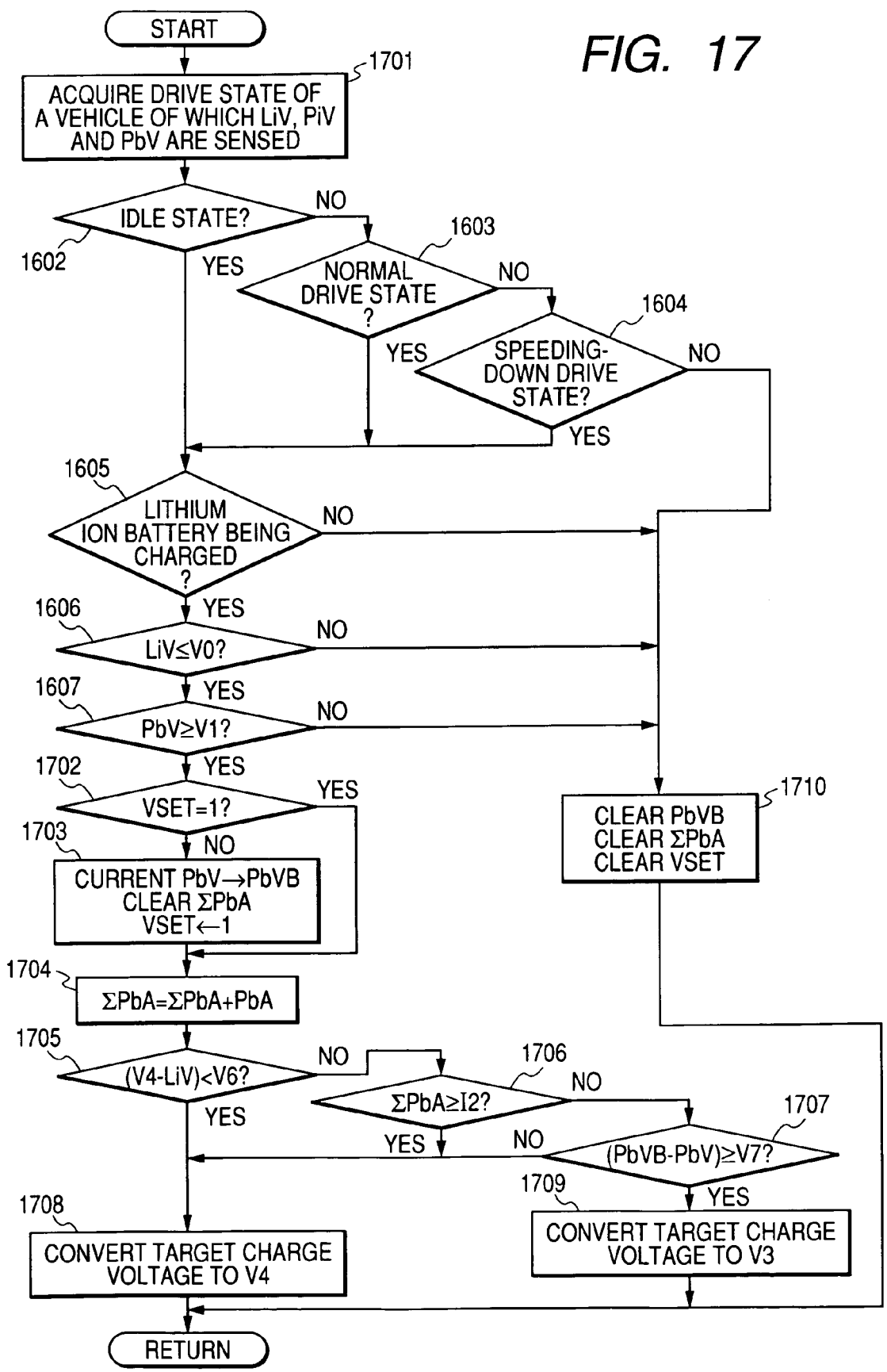
FIG. 17 is a flowchart diagram illustrating an operation of converting an output voltage of a DC/DC converter in the process of controlling the charge of the lithium ion battery according to a thirteenth example embodiment of the present invention.

FIG. 17 is a flowchart diagram illustrating an operation of converting an output voltage of a DC/DC converter in the process of controlling the charge of the lithium ion battery according to a thirteenth example embodiment of the present invention. According to the thirteenth example embodiment, the operation is performed as follow:

(1) the operation of controlling the early charge of the lithium ion battery is performed only in the case of the voltage of the lithium ion battery being lower and the voltage of the lead battery being higher.

(2) The charge of the lead battery has a priority higher than the charge of the lithium ion battery, and when the voltage of the lead battery is low, the operation of the controlling the early charge of the lithium ion battery is not performed.

(3) During the charging of the lithium ion battery, if excessive discharge of the lead battery does not exist or the voltage of the lithium ion battery does not reach a target charge voltage, the output voltage of the DC/DC converter is set to the maximum voltage V3 (for example, 16 volts). If the excessive discharge of the lead battery is detected, or the voltage of the lithium ion battery reaches the target charge voltage, the output voltage of the DC/DC converter is returned to the ordinary target voltage V4 (for example, 15.4 volts). The thirteenth example embodiment will be described with reference to FIG. 17. The same reference numerals will be used to refer to the same or like steps as those described in the twelfth example embodiment.

In step 1701, the voltage LiV of the lithium ion battery, the voltage PbV and the current PbA of the lead battery and the motion of a vehicle are sensed. Next, in step 1602 through step 1604, a drive state of the vehicle is determined similar to the twelfth example embodiment. When it is determined that the vehicle is one of the idle state, normal drive state and the speeding-down drive state, step 1702 is performed. Otherwise, step 1710 is performed.

In step 1702, which is proceeded when the vehicle is in one of the idle state, normal drive state and the speeding-down drive state, it is determined whether a decision flag VSET that is initialized to "0" has a value of "1" or not. If step 1702 is firstly performed, the decision flag VSET is "0" to proceed to step 1703.

In step 1703, the current voltage PbV is stored as a voltage PbVB of the lithium ion battery at an initial stage of charging the lithium ion battery. Next, an accumulation value ΣPbA of the discharge current of the lead battery is cleared and the decision flag VSET described above has a value of "1". As the decision flag VSET is set to the value of "1", the answer to step 1702 comes to "Yes" so that step 1703 is not proceeded. Next, in step 1704, an accumulation value ΣPbA of the discharge current of the lead battery is calculated.

In the next step 1705 through step 1707, an operation of controlling and converting the target charge voltage of the lithium ion battery to a voltage range between V4 and V3 is performed. Here, the voltage V4 is the ordinary target voltage (output voltage) and the voltage V3 is the maximum value of the target voltage (maximum output voltage). In step 1705, a real voltage value of LiV of the lithium ion battery is compared with the ordinary target voltage V4 to determine whether the difference between the real voltage value of LiV of the lithium ion battery and the ordinary target voltage V4 is less than a predetermined voltage V6. If the difference between the real voltage value of LiV of the lithium ion battery and the ordinary target voltage V4 (i.e., V4–LiV) is greater than or equal to the predetermined voltage V6, step 1706 is performed. If the difference between the real voltage value of LiV of the lithium ion battery and the ordinary target voltage V4 is less than the predetermined voltage V6, step 1708 is performed so that the output voltage of the DC/DC converter is converted from the maximum target voltage V3 to the ordinary target voltage V4 and the procedure is terminated.

In step 1706, it is determined whether the accumulation value ΣPbA of the discharge current of the lead battery is greater than or equal to a predetermined threshold value I2 or not. The accumulation value ΣPbA, which is calculated in step 1704, of the discharge current of the lead battery represents the amount of power consumption that the lead battery has discharged after the lithium ion battery starts to be charged. If it is determined in step 1706 that the accumulation value ΣPbA of the discharge current of the lead battery is greater than or equal to the predetermined threshold value I2, step 1708 is performed to convert the output voltage of the DC/DC converter from the maximum target voltage V3 to the ordinary target voltage V4 and the procedure is terminated. If it is determined that the accumulation value ΣPbA of the discharge current of the lead battery is less than the predetermined threshold value I2, step 1707 is performed.

In step 1707, the voltage PbVB of the lithium ion battery at an initial stage of charging the lithium ion battery is compared with a real voltage PbV in the current state of the lead battery to determine whether the difference between the voltage PbVB of the lithium ion battery at an initial stage of charging the lithium ion battery and the real voltage PbV in the current state of the lead battery is greater than or equal to a predetermined voltage V7. If the difference (PbVB−PbV) is greater than or equal to the predetermined voltage V7, step 1709 is performed to convert the output voltage of the DC/DC converter from the ordinary target voltage V4 to the maximum target voltage V3 and the procedure is terminated. If the difference (PbVB−PbV) is less than the predetermined voltage V7, step 1708 is performed to convert the output voltage of the DC/DC converter from the maximum target voltage V3 to the ordinary target voltage V4 and the procedure is terminated.

In addition, if step 1710 is proceeded following to one of the steps 1604, 1605, 1606 and 1607, the voltage PbVB of the lithium ion battery at an initial stage of charging the lithium ion battery, the accumulation value ΣPbA of the discharge current of the lead battery and the decision flag VSET are all cleared and the procedure is terminated. According to the above control operation, with respect to various drive state, when the voltage of the lithium ion battery is lower and the voltage of the lead battery is higher, a control operation of the charge of the lithium ion battery is performed. Namely, during the charging of the lithium ion battery, if excessive discharge of the lead battery does not exist or the voltage of the lithium ion battery does not reach a target charge voltage, the output voltage of the DC/DC converter is set to the maximum voltage V3 (for example, 16 volts). If the excessive discharge of the lead battery is detected, or the voltage of the lithium ion battery reaches the target charge voltage, the output voltage of the DC/DC converter is returned to the ordinary target voltage V4 (for example, 15.4 volts). Therefore, the lithium ion battery may be charged at an early stage.

Note that while in the embodiments, the lead battery and the lithium ion battery are used as the two batteries that are to be installed on the vehicle, the types of batteries used are not limited to these two types, and hence, in place of the lithium ion battery, a nickel-hydrogen battery may be used, or two lead batteries may be used. Furthermore, while in the embodiments, the charge controls are described as being executed by the economical running ECU, the battery ECU and the EFI-ECU which are provided in the automatic engine stop/start control apparatus, the controls described in the invention can also be applied to an integrated ECU in which all controls are executed by an engine control ECU.

What is claimed is:

1. An engine control apparatus adapted to be mounted on a vehicle including: a first battery, supplying power to an electrical load of the vehicle when an engine is in a normal operation; a second battery, supplying power to the electrical load of the vehicle when the engine is in an economical operation; a voltage regulator regulating voltages of the first battery and the second battery; and a current limiter, incorporated in the voltage regulator and limiting a current value flowing from the voltage regulator to the second battery to a limiting value, the engine control apparatus comprising:
    an engine stopping unit, stopping the engine when a first predetermined condition is established;
    an engine starting unit, starting the engine when a second predetermined condition is established;
    a current detecting unit, detecting the current value when the second battery is charged; and
    a changing unit, changing the limiting value between a first limiting value and a second limiting value which is higher than the first limiting value according to the detected current value in a case where the voltage of the second battery is no more than a second predetermined value and the voltage of the first battery is no less than a first predetermined value.

2. The engine control apparatus as set forth in claim 1, further comprising:
    a voltage detecting unit, detecting the voltages of the first battery and the second battery; and
    switching unit, switching a target voltage value of the second battery from a first voltage value to a second voltage value which is higher than the first voltage value in a case where the voltage of the second battery is no more than a second predetermined value and the voltage of the first battery is no less than a first predetermined value.

3. The engine control apparatus as set forth in claim 2,
    wherein the changing unit changes the limiting value to the second limiting value in a case where the current value is equal to the first limiting value in a predetermined time.

4. The engine control apparatus as set forth in claim 2,
    wherein the changing unit changes the limiting value to the first limiting vale in a case where the current value is less than the first limiting value in a predetermined time.

5. The engine control apparatus as set forth in claim 2,
    wherein the second battery is charged when the engine is idled.

6. The engine control apparatus as set forth in claim 2,
    wherein the second battery is charged when the engine is in the normal operation.

7. The engine control apparatus as set forth in claim 2,
    wherein the changing unit changes the limiting value to the first limiting value in a case where the voltage of the second battery is charged to a third voltage value which is lower than the first voltage value.

8. The engine control apparatus as set forth in claim 2, further comprising a calculating unit, calculating a differential voltage between the first voltage value and the voltage of the second battery,
    wherein the switching unit switches the target voltage value from the second voltage value to the first voltage value in a case where the differential voltage is lower than a forth voltage value.

9. The engine control apparatus as set forth in claim 8,
    wherein the switching unit switches the target voltage value from the second voltage value to the first voltage value in a case where the voltage of the first battery is no more than a sixth voltage value.

10. The engine control apparatus as set forth in claim 8, further comprising a prohibiting unit, prohibiting switching the target voltage value from the second voltage value to the first voltage value until the first battery is charged with a voltage corresponding to one of a discharged current value discharged from the first battery when the second battery is charged or a voltage drop when the second battery is charged in a case where the second battery is continuously charged after the switching unit switches the target voltage value from the second voltage value to the first voltage value.

11. The engine control apparatus as set forth in claim 8, further comprising:
    a second calculating unit, calculating a second differential voltage between the first voltage value and the voltage of the second battery at the time of filling a condition where the switching unit switches the target voltage value from the second voltage value to the first voltage value;
    an integrating unit, integrating the second differential voltage calculated by the second calculating unit;
    a correcting unit, multiplying the second differential voltage and a integrated value integrated by the integrating unit by a correction coefficient respectively and correcting the first voltage value by adding a multiplied value multiplied by the correcting unit; and
    a control unit, controlling the voltage of the second battery so as to converge on the first voltage value.

12. The engine control apparatus as set forth in claim 11, further comprising a judging unit, judging whether the second differential voltage is no more than a third threshold value or not,
  wherein the correcting unit switches the correction coefficient in a case where it is judged by the judging unit that the second differential voltage is no more than the third threshold value.

13. The engine control apparatus as set forth in claim 11, further comprising a judging unit, judging whether the second differential voltage is no more than a fourth threshold value or not,
  wherein the integrating unit clears the integrated value at the time of the second differential voltage being no more than a fourth threshold value,
  wherein the control unit controls the voltage of the second battery so as to converge on the first voltage value.

14. The engine control apparatus as set forth in claim 11,
  wherein the correcting unit determines whether a correction processing of the first voltage of the second battery is performed or not according to whether the second battery is charged or not.

15. The engine control apparatus as set forth in claim 2, further comprising a calculating unit, calculating a differential voltage between the voltage of the first battery before a charging control of the second battery is performed and the voltage of the first battery when the charging control of the second battery is performed,
  wherein the switching unit switches the target voltage value from the second voltage value to the first voltage value in a case where the differential voltage is lower than a fifth voltage value.

16. The engine control apparatus as set forth in claim 15, further comprising an integrating unit, integrating a discharge current value of the first battery when the charging control of the second battery is performed,
  wherein the switching unit switches the target voltage value from the second voltage value to the first voltage value in a case where the differential voltage is lower than a fifth voltage value and a integrated value integrated by the integrating unit is no less than a first threshold value.

17. The engine control apparatus as set forth in claim 2, further comprising an integrating unit, integrating a discharged current value of the first battery when the charging control of the second battery is performed,
  wherein the switching unit switches the target voltage value from the second voltage value to the first voltage value in a case where a integrated value integrated by the integrating unit is no less than a first threshold value.

18. The engine control apparatus as set forth in claim 2,
  wherein the changing unit changes the limiting value to the second limiting value in a case where the switching unit switches the target voltage value from the second voltage value to the first voltage value.

19. An engine control apparatus adapted to be mounted on a vehicle including: a first battery, supplying power to an electrical load of the vehicle when an engine is in a normal operation; a second battery, supplying power to the electrical load of the vehicle when the engine is in an economical operation; and a voltage regulator, regulating voltages of the first battery and the second battery; the engine control apparatus comprising:
  a voltage detecting unit, detecting the voltages of the first battery and the second battery; and
  switching unit, switching a target voltage value of the second battery from a first voltage value to a second voltage value which is higher than the first voltage value when the second battery is charged in a case where the voltage of the second battery is no more than a second predetermined value and the voltage of the first battery is no less than a first predetermined value.

20. An engine control method for an vehicle adapted to include; a first battery, supplying power to an electrical load of the vehicle when an engine is in a normal operation; a second battery, supplying power to the electrical load of the vehicle when the engine is in an economical operation; a voltage regulator regulating voltages of the first battery and the second battery; and a current limiter, incorporated in the voltage regulator and limiting a current value flowing from the voltage regulator to the second battery to a limiting value, the engine control method comprising:
  stopping the engine when a first predetermined condition is established;
  starting the engine when a second predetermined condition is established;
  detecting the current value when the second battery is charged; and
  changing the limiting value between a first limiting value and a second limiting value which is higher than the first limiting value according to the detected current value in a case where the voltage of the second battery is no more than a second predetermined value and the voltage of the first battery is no less than a first predetermined value.

21. An engine control system adapted to be mounted on a vehicle including: a first battery, supplying power to an electrical load of the vehicle when an engine is in a normal operation; a second battery, supplying power to the electrical load of the vehicle when the engine is in an economical operation; a voltage regulator regulating voltages of the first battery and the second battery; and a current limiter, incorporated in the voltage regulator and limiting a current value flowing from the voltage regulator to the second battery to a limiting value, the engine control apparatus comprising:
  an engine stopping unit, stopping the engine when a first predetermined condition is established;
  an activator, starting the engine when a second predetermined condition is established;
  a current detecting unit, detecting the current value when the second battery is charged; and
  a changing unit, changing the limiting value between a first limiting value and a second limiting value which is higher than the first limiting value according to the detected current value in a case where the voltage of the second battery is no more than a second predetermined value and the voltage of the first battery is no less than a first predetermined value.

22. An engine control apparatus automatically activating and deactivating an engine, and adapted to be mounted on a vehicle including: a first battery, which is used when the engine is in a normal operation; a second battery, which is used when the engine is automatically deactivated; and a voltage regulator, performing a charge control of the second battery and limiting a current value flowing from the voltage regulator to the second battery to a limiting value, the engine control apparatus comprising:
  a controller, operable to increase a target charge voltage value more than usual, and changing the limiting value between a first limiting value and a second limiting value which is higher than the first limiting value according to the current value in a case where a voltage of the first battery and a voltage of the second battery have a predetermined relation when the second battery is charged.

* * * * *